United States Patent
Lawrence

(10) Patent No.: US 12,497,314 B2
(45) Date of Patent: Dec. 16, 2025

(54) METHOD FOR SUPPLYING RETURN ACTIVATED SLUDGE

(71) Applicant: Xylem Water Solutions U.S.A., Inc., Brown Deer, WI (US)

(72) Inventor: Darren Paul Lawrence, Warwickshire (GB)

(73) Assignee: Xylem Water Solutions U.S.A., Inc., Brown Deer, WI (US)

( * ) Notice: Subject to any disclaimer, the term of this patent is extended or adjusted under 35 U.S.C. 154(b) by 719 days.

(21) Appl. No.: 17/761,973

(22) PCT Filed: Sep. 18, 2020

(86) PCT No.: PCT/IB2020/058740
§ 371 (c)(1),
(2) Date: Mar. 18, 2022

(87) PCT Pub. No.: WO2021/053621
PCT Pub. Date: Mar. 25, 2021

(65) Prior Publication Data
US 2022/0340463 A1 Oct. 27, 2022

(30) Foreign Application Priority Data
Sep. 19, 2019 (GB) .................................. 1913515

(51) Int. Cl.
*C02F 1/00* (2023.01)
*C02F 3/12* (2023.01)
*C02F 3/30* (2023.01)

(52) U.S. Cl.
CPC .............. *C02F 3/302* (2013.01); *C02F 1/004* (2013.01); *C02F 3/1205* (2013.01);
(Continued)

(58) Field of Classification Search
CPC ...... C02F 3/30; C02F 1/00; C02F 3/12; C02F 3/302; C02F 1/004; C02F 3/1205;
(Continued)

(56) References Cited

U.S. PATENT DOCUMENTS 4,246,099 A * 1/1981 Gould ....................... C02F 3/30
210/603
6,743,362 B1 6/2004 Porteous et al.
(Continued)

FOREIGN PATENT DOCUMENTS

CA 2497391 A1 8/2006
CN 101088941 A 12/2007
(Continued)

OTHER PUBLICATIONS

Li et al., "Principle of Water Treatment", Wuhan University of Technology Press, 2013, pp. 155-156. [Relevant for Reasons stated in Chinese Office Action].
Tchobanoglous et al., "Wastewater Engineering—Treatment and Reuse", Metcalf & Eddy Inc., 2003, pp. 1-1846, 4th Edition, McGraw Hill Companies Inc.

*Primary Examiner* — Hayden Brewster
(74) *Attorney, Agent, or Firm* — The Webb Law Firm

(57) ABSTRACT

A method of processing waste water to produce a filtrate is provided. The method includes the steps of: introducing untreated wastewater to an inlet zone of a bioreactor; introducing a concentrate of treated waste water with at least 10,000 mg/L of total suspended solids into the inlet zone of the bioreactor to form a biological active mixture; aerating the biological active mixture in an aeration zone of the bioreactor to produce treated waste water; filtering the treated waste water to produce a filtrate and the concentrate, wherein the filtrate created by the filtering has total suspended solids of less than 10 mg/L; transferring at least a (Continued)

portion of the concentrate to the inlet zone of the bioreactor; and transferring the filtrate external to the bioreactor as clean water.

11 Claims, 12 Drawing Sheets

(52) U.S. Cl.
CPC ...... *C02F 3/1278* (2013.01); *C02F 2209/006* (2013.01); *C02F 2209/10* (2013.01); *C02F 2301/024* (2013.01); *C02F 2303/16* (2013.01)

(58) Field of Classification Search
CPC .............. C02F 3/1278; C02F 2209/006; C02F 2209/10; C02F 2301/024; C02F 2303/16; C02F 2209/15; C02F 2209/22; C02F 1/444; Y92W 10/10; Y02W 10/10
See application file for complete search history.

(56) References Cited

U.S. PATENT DOCUMENTS

| | | |
|---|---|---|
| 6,783,671 B2 | 8/2004 | Unger |
| 2005/0194310 A1 | 9/2005 | Yamamoto et al. |
| 2014/0131272 A1 | 5/2014 | Josse |

FOREIGN PATENT DOCUMENTS

| | | | | |
|---|---|---|---|---|
| CN | 203307110 U | 11/2013 | | |
| CN | 108726807 A | 11/2018 | | |
| EP | 1463687 B1 | * 5/2011 | ............ | C02F 3/1268 |
| JP | 20031293 A | 1/2003 | | |
| WO | 2013147671 A1 | 10/2013 | | |
| WO | WO-2018194690 A1 | * 10/2018 | .......... | B01D 61/145 |
| WO | 2020098997 A1 | 5/2020 | | |

* cited by examiner

METHOD FOR SUPPLYING RETURN ACTIVATED SLUDGE

CROSS REFERENCE TO RELATED APPLICATIONS

This application is the United States national phase of International Application No. PCT/IB2020/058740, filed Sep. 18, 2020, and claims priority to United Kingdom Patent Application Number 1913515.1, filed Sep. 19, 2019, the disclosures of which are hereby incorporated by reference in their entirety.

BACKGROUND OF THE INVENTION

Field of the Invention

The present invention relates to a system for waste water treatment and a method for treating waste water.

Description of Related Art

Sewage treatment or wastewater treatment processes and associated plant have untreated water entering the process which contains organic matter, nitrogen compounds, phosphorous compounds, fats, oils and grease. The treatment plant should process the untreated inflow water to output treated water which is suitable for discharge in to a river or for other uses such as irrigation of washing or for potable water.

Water treatment processes and the associated process plant are complex, requiring substantial resources in terms of land, treatment plant including substantial civil engineering, and operational cost. In addition, the treatment processes must be able to cope with a range of raw water inputs, such as rainwater, which can increase the input flow of untreated water by a factor of 5 or more, from normal operational conditions. Many treatment plants and their associated processes struggle to cope with higher rain inflows, which may necessitate the use of additional tank storage and/or non-treated or poorly treated water exiting the plant to a river or other destination.

Many treatment plants have a bioreactors of some kind which have a combination of anoxic/denitrification and nitrification zones. The bioreactor processes the raw water to consume the organic matter. However, the size of the bioreactor is large to enable the process to be completed.

A number of these treatment plants are operating globally using established processes such as the conventional activated sludge (CAS) or, more expensive, membrane bioreactor (MBR) treatment process. U.S. Pat. No. 6,783,671 B2 shows an enhanced CAS system. U.S. Pat. No. 6,743,362 B1 shows a process based on an MBR.

A typical conventional active sludge process running at 4 g/L biomass in the nitrification zone of a CAS treatment plant is shown in FIG. 1. FIG. 1 illustrates the main components of a typical CAS treatment plant (301), including a main tank or bioreactor (208) and a clarifier (209).

The untreated waste water (200) (also referred to as wastewater, influent and influent water) flow in at the waste water input (201), having an approximate total suspended solids (TSS) (All TTS measurements recited herein are measured according to ISO 11923:1997) content of 250 mg/L, enters an anaerobic (AN) region (202) with a nominal flow rate of Q=1,500 m³/day, dissolved oxygen (DO) of zero, and negative redox potential (ORP) of approximately −200 mV. The flow rate (Q) at various points of the process are shown in FIG. 1. Here, anaerobic bacteria release phosphorous (ORP drops to approximately −300 mV). The liquid having a level (253), in the bioreactor (208), flows into a denitrification (DN) region (202a), where the low DO regime favors bio-reactions leading to de-nitrification (nitrates are transformed into nitrogen gases) of the influent water (200). Here, the liquid is mixed with the low oxygen, high TSS return activated sludge (RAS) from the clarifier (209).

A pump (212) feeds back from the DN zone (202a) a fraction of the sludge-rich liquor present to the AN zone (202) to prevent dilution of the biomass in AN zone (202) due to the influx water (200) (also referred to as untreated waste water) which enters at the waste water input (201). The output of (202a) enters into an aeration region known as the nitrification zone of the bioreactor (203) having TSS=4,000 mg/L and where an aeration system (254) increases the DO in the fluid to 2 mg/L and saturates the ORP to 100 mV, creating a favorable environment for aerobic bacteria to digest BOD and to transform ammonia into nitrate as well as allowing phosphorus luxury uptake. An additional pump (211) transports the sludge-rich liquor present in region (203), known as nitrate RAS, to region (202a).

The sludge containing the flocculated bacteria is fed into a clarifier (209). Sedimentation of the activated sludge at the bottom of the clarifier increases the TSS to 8000 mg/L. The DO drops due to lack of aeration. This divergence (increasing TSS and decreasing DO) is key to the treatment process as it allows the low DO, thickened activated sludge to be returned to the front of the process, into the denitrification tank (202a) by a pump (210). Pump (210) is an expensive part of the plant, as it has to pump TSS sludge for a long distance and with high head, typically 10 to 15 m. The power consumption of the pump (210) is also significant. The requirement of a low-DO return sludge is not limited to CAS but—for the reason explained above—to all processes with RAS recirculation.

The high nitrate content does not allow the RAS to be returned to the AN region. This is a limitation of the CAS process as the AN region would benefit from a high TSS to mitigate the dilution effect from the influent (200). Clean (TSS~20 mg/L; DO=0) effluent (205a) is decanted from the top of the clarifier. Part of the high-solid-content sludge at the bottom of the clarifier is separately collected (207a) and wasted to maintain stable conditions in the plant.

The TSS of the RAS decreases in the AN region to <2000 mg/L due to dilution with influent water. Given that the required working biomass in this region is typically ~760 kg, this dilution forces the AN tank to have a volume of ~400 m³ (i.e., almost 50% of the whole tank (208) to accommodate the required amount of working biomass.

The mass balance of total suspended solids for the CAS plant of FIG. 1 is shown in Table 1 below.

TABLE 1

| Zone | Volume (m³) | g/L | Total kg |
|---|---|---|---|
| N | 750 | 4 | 3000 |
| DN | 250 | 3.8 | 950 |
| AN | 400 | 1.9 | 760 |
| Total Average TSS | 1400 | 3.36 | 4710 |

The CAS process suffers from two significant limitations. The maximum TSS at the end of the denitrification tank (203) is limited to values of less than 4000 mg/L. Given a required total amount of biomass needed to treat the average daily flow (ADF), this dictates the size of the nitrification tank. Higher TSS would require longer sedimentation times in the clarifier (209) and therefore unpractically larger clarifiers at a given flow rate. It would otherwise be desirable to operate the denitrification tank at higher TSS as this would allow smaller treatment plants for the same total amount of suspended solids.

Another limitation of the CAS is that correct sedimentation of the flocculated bacteria in the clarifier requires that the flow of sludge-containing liquid into the clarifier should not exceed a maximum design value of 1.5 m/h vertical up-flow velocity at peak hour flow. If the flow is too large with respect to the ADF, as it might happen in the case of storm-water, only partial sedimentation occurs and the effluent (205a) would exceed the maximum allowable TSS consent (e.g., 20 mg/L BOD and 20 mg/L TSS). Typically, the limit of the clarifier is a hydraulic rather than a sedimentation limit, as the vertical velocity may exceed 1.5 m/h hence resulting in so-called sludge carry-over.

Another process and system known in the art, an MBR, achieves thickening and filtration using a membrane bioreactor that replaces the clarifier in the CAS process. A typical MBR plant (302) is shown in FIG. 2. Similarly to CAS, the MBR comprises a bioreactor (208). An MBR reactor (213) and a deoxygenation (DeOX) tank (214) replace the equivalent CAS clarifier.

Influent water (200) (also referred to as untreated waste water) that enter at the waste water input (201), which may include volatile fatty acids (VFA) and has a TSS of about 250 mg/L and DO=0 mg/L, enters an anaerobic (AN) region (202) where anaerobic bacteria release phosphorous, followed by a denitrification/anoxic (DN) region (202a). The liquid has a level (253) in the bioreactor (208). In region (202a) the low DO regime favors bio-reactions leading to de-nitrification (nitrates are transformed into nitrogen gases) of the influent water (200). A pump (212) feeds back from region (202a) a fraction of the sludge-rich liquor (DO=0) present there to region (202) to prevent dilution of the biomass in region (202) due to the influx water (200).

The output of (202a) enters into an aeration region (203) where an aeration system (254) increases the DO in the fluid to 2 mg/L, creating a favorable environment for aerobic bacteria to digest BOD and to transform ammonia into nitrate as well as allowing phosphorus luxury uptake. At the aeration region (203), the output may have a TSS of 8,000 mg/L. ORP, TSS, and DO profiles, reflect those of the CAS system in regions (202), (202a), and (203).

The activated sludge is fed to the MBR (213) where thickening and filtration occur. This is accomplished by means of porous polymeric membranes, having pore sizes with diameters typically less than 40 nm.

MBR requires energetic air scouring at (213) to avoid clogging the pores and membrane substrate, leading a sludge saturated with DO at 5-10 mg/L dependent on process temperature and ORP>100 mV. This membrane return activated sludge (MRAS) must return to the aerated zone (203) to supplement the oxygen or to the front-end anoxic oxygen free zone (202a). The MRAS returning to 202a requires an additional treatment in the DeOX tank (214) to lower the DO, which would otherwise poison the anoxic or anaerobic treatment. High air content is needed in the MBR in order to remain clean, thus, the DeOX tank (214) is required to lower the level of DO. The output leaving the DeOX tank (214) may have a TSS of 10,000 mg/L and DO=0 mg/L.

The high nitrate content does not allow the RAS to be returned to the AN region. Similarly to CAS, this is a limitation of the MBR process as the AN region would benefit from a high TSS to mitigate the dilution effect from the influent (200).

Part of the high-solid-content sludge at the bottom of the membrane tank is separately collected (207a) and wasted to maintain stable conditions in the plant. Clean, effluent (205a) is collected from the top of the membrane filtration system. The clean effluent (205a) has a TSS of 0 mg/L and DO=0 mg/L.

The mass balance of TSS for the MBR plant of FIG. 2 is shown in Table 2 below.

TABLE 2

| Zone | Volume (m^3) | g/L | Total kg |
|---|---|---|---|
| N | 450 | 8 | 3000 |
| DN | 150 | 8 | 950 |
| AN | 180 | 4 | 760 |
| M | 80 | 10 | n/a |
| DeOX | 100 | 10 | n/a |
| Total | 780 | | 4800 |
| Average TSS | | 6.2 | |

A common problem with MBR is that the MRAS is limited to a TSS concentration of 12,000 mg/L to avoid clogging the membrane. Another common problem with MBR is that the flux rate across the membranes is limited to values smaller than 25 L/(m$^2$h). Therefore, to achieve practical filtration rates, the surface area of the membranes has to be large. A further common problem with MBR is the cost of the membrane material, which is exacerbated by its limited lifetime, typically less than 5 years.

Another limitation of MBR treatment plants becomes apparent when considering increased influent flow (e.g., during storm-water condition). TSS in the MBR region increases to values of 14,000 mg/L, close to the limit of allowable solids governed by the proprietary membrane used, decreasing its expected lifetime and decreasing the required flux rate. Dilution in the AN region causes the TSS to decrease from 4,000 mg/L to 2,000 mg/L impacting the biological processes in this region in a similar way to CAS by increasing the volume of tank require to carry out the biological reaction.

SUMMARY OF THE INVENTION

In view of the foregoing, a waste water treatment plant, system, and/or process that reduces the cost, space, and complexity of the system, while maintaining high flux rates and the ability to filter influent with high TSS content, is desired.

In one non-limiting example of the present invention, a method of processing waste water to produce a filtrate includes the steps of: introducing untreated wastewater to an inlet zone of a bioreactor; introducing a concentrate of treated waste water with at least 10,000 mg/L of total suspended solids into the inlet zone of the bioreactor to form a biological active mixture; aerating the biological active mixture in an aeration zone of the bioreactor to produce treated waste water; filtering the treated waste water to produce a filtrate and the concentrate, wherein the filtrate created by the filtering has total suspended solids of less than 10 mg/L; transferring at least a portion of the concentrate to the inlet zone of the bioreactor; and transferring the filtrate external to the bioreactor as clean water.

In another non-limiting example of the present invention, a method of processing waste water to produce a filtrate; the steps comprising: combining untreated waste water and a concentrate of treated wasted waste water with at least 10,000 mg/L of total suspended solids to form a biological active mixture; transferring the biological active mixture into an inlet zone of a bioreactor; aerating the biological active mixture in an aeration zone of the bioreactor to produce treated waste water; filtering the treated waste water to produce a filtrate and the concentrate, wherein the filtrate created by the filtering has total suspended solids of less than 10 mg/L; transferring at least a portion of the concentrate to the inlet zone of the bioreactor; and transferring the filtrate external to the bioreactor as clean water. The combining step may further include actively mixing the untreated waste water and the concentrate of treated wasted waste water with at least 10,000 mg/L of total suspended solids to form the biological active mixture. The combining step may further include combining the untreated waste water and the concentrate of treated wasted waste water with at least 10,000 mg/L of total suspended solids in a transfer pipe to form the biological active mixture. The method may further include introducing untreated waste water into the inlet zone of the bioreactor.

Both of the above methods may be further defined as follows. The biological active mixture may include untreated wastewater and the concentrate of treated wastewater. The method may further include holding the biological active mixture in the inlet zone for a predetermined time to enable an anoxic process in an anoxic zone and/or a denitrification zone. The method may further include at least partially mixing at least a portion of the untreated waste water and the concentrate in at least a portion of a pipe that transfers the concentrate to the inlet zone. The inlet zone may be within or adjacent to an anoxic zone. A contactor may mix the untreated wastewater and the concentrate in the inlet zone, where the mixing is highly turbulent. The transferring at least a portion of the concentrate step may further include: pumping the concentrate and/or maintaining a differential liquid head between the source of the concentrate and the inlet zone. The filtering may be performed by a filter having a permeable substrate, and may further include: deliberately fouling the permeable substrate to form a layer of deposited suspended solids from the treated waste water on the permeable substrate, removing at least a portion of the layer, and mixing the removed portion of the layer with at least a portion of the treated waste water to form the concentrate with the at least 10,000 mg/L of total suspended solids. The filtering may be performed by a filter having a permeable substrate, and may further include: deliberately fouling the permeable substrate to form a layer of deposited suspended solids from the treated waste water on the permeable substrate, removing at least a portion of the layer, and mixing the removed portion of the layer with at least a portion of the treated waste water to form the concentrate with at least 10,000 mg/L and below 70,000 mg/L of total suspended solids. The filtering may be performed by a filter having a permeable substrate, and may further include: deliberately fouling the permeable substrate to form a layer of deposited suspended solids from the treated waste water on the permeable substrate, removing at least a portion of the layer, and mixing the removed portion of the layer with at least a portion of the treated waste water to form the concentrate with at least 10,000 mg/L and below 50,000 mg/L of total suspended solids. The filtering may be performed by a filter having a permeable substrate, and may further include: deliberately fouling the permeable substrate to form a layer of deposited suspended solids from the treated waste water on the permeable substrate, removing at least a portion of the layer, and mixing the removed portion of the layer with at least a portion of the treated waste water to form the concentrate with at least 15,000 mg/L and below 25,000 mg/L of total suspended solids. The bioreactor may include a single tank. The bioreactor may include a plurality of tanks which are interconnected. The inlet zone may be non-aerating. The method may further include: monitoring the total suspended solids of the concentrate; and controlling the filtering of the treated waste water to maintain a concentrate with at least 10,000 mg/L total suspended solids. The method may further include spraying at least a portion of the treated waste water at the permeable substrate to remove at least a portion of the layer of deposited suspended solids. The filtering may be performed by a liquid-permeable filtering element having a first face and a second face opposite of the first face, where at least an area of the first face of the filtering element is subject to treated waste water under pressure and a pressure across said area is greater than 0 and less than or equal to 5.9 kPa, where the concentrate is accumulated on the first face of the filtering element. The filtering may be performed by a filter machine including the liquid-permeable filtering element and may further include at least one nozzle that directs at least one jet at the second face of the filtering element, through the filtering element, and towards the first face of the filtering element to remove and/or aid in removal of the layer of deposited solids. The method may further include: introducing gas bubbles from at least one gas feeder into the treated waste water. The transferring at least a portion of concentrate step may include: pumping the concentrate generated by the filtering to the inlet zone of the bioreactor. The method may further include biologically treating the untreated waste water; wherein the biologically treating step comprises: flocculation of an influent, nitrification, an anoxic zone, denitrification, or a combination thereof. A level of dissolved oxygen in the concentrate may be no more than 0.5 mg/L. The level of dissolved oxygen in the concentrate may be no more than 0.1 mg/L. A level of nitrate ($NO_3$) in the concentrate may be no more than 3 mg/L. A height of a destination of the concentrate in the bioreactor and a height of a source of the concentrate may be arranged to reduce a height difference between the source and the destination, and/or to reduce a pumping head requirement of at least one pump.

In another non-limiting example of the present invention, a waste water treatment plant for processing waste water includes: a bioreactor including: an inlet zone for containing untreated wastewater and a concentrate, and an aeration zone with gas feeders, a filter for generating a filtrate and a concentrate, and a mechanism to transfer the concentrate from the filter to the inlet zone.

The mechanism may include a pump and at least one transfer pipe between the filter machine and the inlet zone. The transfer pipe may include an untreated waste water inlet. The mechanism may include a differential height between the inlet zone and an external tank provided for the filter. The waste water treatment plant may further include a contactor having an inlet from a waste water inlet and an inlet from a transfer pipe. The filter may be a filter machine having a permeable substrate and where the permeable substrate is deliberately fouled to form a layer of deposited suspended solids from the treated waste water so as to achieve the concentrate with the at least 10,000 mg/L of total suspended solids. The filter may be a filter machine having a permeable substrate and where the permeable substrate is deliberately fouled to form a layer of deposited suspended solids from the treated waste water so as to achieve the concentrate with the at least 10,000 mg/L and below 70,000 mg/L of total suspended solids. The filter may be a filter machine having a permeable substrate and where the permeable substrate is deliberately fouled to form a layer of deposited suspended solids from the treated waste water so as to achieve the concentrate with the at least 10,000 mg/L and below 50,000 mg/L of total suspended solids. The filter may be a filter machine having a permeable substrate and where the permeable substrate is deliberately fouled to form a layer of deposited suspended solids from the treated waste water so as to achieve the concentrate with the at least 15,000 mg/L and below 25,000 mg/L of total suspended solids. The bioreactor may include a single tank. The bioreactor may include a plurality of tanks which are interconnected. The filter may be a filter machine. The filter machine may include a liquid-permeable filtering element including a first face and a second face opposite of the first face, where the liquid-permeable filtering element is at least partially submerged in a liquid. The liquid-permeable filtering element may be arranged to be cycled through the liquid such that: in a first position, an area of the first face of the filtering element is subject to liquid under pressure and a pressure across the filtering element greater than 0 and less than or equal to 5.9 kPa; and in a second position, the area is not subjected to liquid under pressure or is subjected to liquid at a lower pressure. The filter machine may include at least one nozzle that directs at least one jet at the second face of the filtering element, through the filtering element, and towards the first face of the filtering element to remove and/or aid in removal of solids accumulated on the first face of the filtering element. The filter machine may be configured to filter liquid having total suspended solids of between 1,000 mg/L and 50,000 mg/L so as to produce filtered liquid having total suspended solids of no more than 10 mg/L. The filtering element may be configured to be cycled at a speed such that a permeation flux is between 200 L/(m$^2$h) to 5,000 L/(m$^2$h) and a thickness of a layer of accumulated solids when the filtering element reaches the second position is between 0 and 6 cm. A pore size of the filtering element may be between 2 and 40 μm. The waste water treatment plant may further include: at least one gas feeder to introduce gas bubbles into the treated waste water. The concentrate may have a total suspended solids in the range of 10,000 mg/L to 50,000 mg/L. The concentrate may have a total suspended solids in the range of 15,000 mg/L to 25,000 mg/L. The waste water treatment plant may further include: at least one pump configured to transfer the concentrate to the bioreactor. The permeation flux of the filtering element may be between 500 L/(m$^2$h) to 5,000 L/(m$^2$h). The waste water treatment plant may further include a biological treatment of the untreated waste water; where the biological treatment includes: flocculation of an influent, nitrification, an anoxic zone, denitrification, or a combination thereof. A level of dissolved oxygen in the concentrate may be no more than 0.5 mg/L, preferably no more than 0.1 mg/L. A level of nitrate ($NO_3$) in the concentrate may be no more than 3 mg/L. A height of a destination of the concentrate in the bioreactor and a height of a source of the concentrate may be arranged to reduce a height difference between the source and the destination, and/or to reduce a pumping head requirement of at least one pump.

A system, may include: the waste water treatment plant according to any of the embodiments described above; a set of one or more sensors configured to monitor the waste water treatment plant; a set of one or more actuators, a set of one or more motors and pumps, or a combination thereof, configured to control the waste water treatment plant; a set of one or more computer systems configured to receive a signal from the set of one or more sensors and to provide control signals to control the set of one or more actuators, the set of one or more motors and pumps, or the combination thereof.

Various preferred and non-limiting examples or aspects of the present invention will now be described and set forth in the following numbered clauses:

Clause 1: A method of processing waste water to produce a filtrate; the steps comprising: introducing untreated wastewater to an inlet zone of a bioreactor; introducing a concentrate of treated waste water with at least 10,000 mg/L of total suspended solids into the inlet zone of the bioreactor to form a biological active mixture; aerating the biological active mixture in an aeration zone of the bioreactor to produce treated waste water; filtering the treated waste water to produce a filtrate and the concentrate, wherein the filtrate created by the filtering has total suspended solids of less than 10 mg/L; transferring at least a portion of the concentrate to the inlet zone of the bioreactor; and transferring the filtrate external to the bioreactor as clean water.

Clause 2: A method of processing waste water to produce a filtrate; the steps comprising: combining untreated waste water and a concentrate of treated wasted waste water with at least 10,000 mg/L of total suspended solids to form a biological active mixture; transferring the biological active mixture into an inlet zone of a bioreactor; aerating the biological active mixture in an aeration zone of the bioreactor to produce treated waste water; filtering the treated waste water to produce a filtrate and the concentrate, wherein the filtrate created by the filtering has total suspended solids of less than 10 mg/L; transferring at least a portion of the concentrate to the inlet zone of the bioreactor; and transferring the filtrate external to the bioreactor as clean water.

Clause 3: The method of clause 1 or 2, wherein the biological active mixture comprises untreated wastewater and the concentrate of treated wastewater.

Clause 4: The method of any one of clauses 1-3, further comprising holding the biological active mixture in the inlet zone for a predetermined time to enable an anoxic process in an anoxic zone and/or a denitrification zone.

Clause 5: The method of any one of clauses 1-4, further comprising at least partially mixing at least a portion of the untreated waste water and the concentrate in at least a portion of a pipe that transfers the concentrate to the inlet zone.

Clause 6: The method of any one of clauses 1-5, wherein the inlet zone is within or adjacent to an anoxic zone.

Clause 7: The method of any one of clauses 1-6, wherein a contactor mixes the untreated wastewater and the concentrate in the inlet zone, wherein the mixing is highly turbulent.

Clause 8: The method of any one of clauses 1-7, wherein the transferring at least a portion of the concentrate step further comprises: pumping the concentrate and/or maintaining a differential liquid head between the source of the concentrate and the inlet zone.

Clause 9: The method of any one of clauses 1-8, wherein the filtering is performed by a filter having a permeable substrate, and further comprising: deliberately fouling the permeable substrate to form a layer of deposited suspended solids from the treated waste water on the permeable substrate, removing at least a portion of the layer, and mixing the removed portion of the layer with at least a portion of the treated waste water to form the concentrate with the at least 10,000 mg/L of total suspended solids.

Clause 10: The method of any one of clauses 1-8, wherein the filtering is performed by a filter having a permeable substrate, and further comprising: deliberately fouling the permeable substrate to form a layer of deposited suspended solids from the treated waste water on the permeable substrate, removing at least a portion of the layer, and mixing the removed portion of the layer with at least a portion of the treated waste water to form the concentrate at least 10,000 mg/L and below 70,000 mg/L of total suspended solids.

Clause 11: The method of any one of clauses 1-8, wherein the filtering is performed by a filter having a permeable substrate, and further comprising: deliberately fouling the permeable substrate to form a layer of deposited suspended solids from the treated waste water on the permeable substrate, removing at least a portion of the layer, and mixing the removed portion of the layer with at least a portion of the treated waste water to form the concentrate at least 10,000 mg/L and below 50,000 mg/L of total suspended solids.

Clause 12: The method of any one of clauses 1-8, the filtering is performed by a filter having a permeable substrate, and further comprising: deliberately fouling the permeable substrate to form a layer of deposited suspended solids from the treated waste water on the permeable substrate, removing at least a portion of the layer, and mixing the removed portion of the layer with at least a portion of the treated waste water to form the concentrate at least 15,000 mg/L and below 25,000 mg/L of total suspended solids.

Clause 13: The method of any one of clauses 1-12, wherein the bioreactor comprises a single tank.

Clause 14: The method of any one of clauses 1-12, wherein the bioreactor comprises a plurality of tanks which are interconnected.

Clause 15: The method of any one of clauses 1-14, wherein the inlet zone is non-aerating.

Clause 16: The method of any one of clauses 1-15, further comprising: monitoring the total suspended solids of the concentrate; and controlling the filtering of the treated waste water to maintain a concentrate with at least 10,000 mg/L total suspended solids.

Clause 17: The method of any one of clauses 9-12, further comprising spraying at least a portion of the treated waste water at the permeable substrate to remove at least a portion of the layer of deposited suspended solids.

Clause 18: The method of any one of clauses 1-17, wherein the filtering is performed by a liquid-permeable filtering element having a first face and a second face opposite of the first face, wherein at least an area of the first face of the filtering element is subject to treated waste water under pressure and a pressure across said area is greater than 0 and less than or equal to 5.9 kPa, wherein the concentrate is accumulated on the first face of the filtering element.

Clause 19: The method of clause 18, wherein the filtering is performed by a filter machine comprising the liquid-permeable filtering element and further comprises at least one nozzle that directs at least one jet at the second face of the filtering element, through the filtering element, and towards the first face of the filtering element to remove and/or aid in removal of the layer of deposited solids.

Clause 20: The method of any one of clauses 1-19, further comprising: introducing gas bubbles from at least one gas feeder into the treated waste water.

Clause 21: The method of any one of clauses 1-20, wherein the transferring at least a portion of concentrate step comprises: pumping the concentrate generated by the filtering to the inlet zone of the bioreactor.

Clause 22: The method of any one of clauses 1-21, further comprising biologically treating the untreated waste water; wherein the biologically treating step comprises: flocculation of an influent, nitrification, an anoxic zone, denitrification, or a combination thereof.

Clause 23: The method of any one of clauses 1-22, wherein a level of dissolved oxygen in the concentrate is no more than 0.5 mg/L.

Clause 24: The method of any one of clauses 1-23, wherein the level of dissolved oxygen in the concentrate is no more than 0.1 mg/L.

Clause 25: The method of any one of clauses 1-24, wherein a level of nitrate ($NO_3$) in the concentrate is no more than 3 mg/L.

Clause 26: The method of any one of clauses 1-25, wherein a height of a destination of the concentrate in the bioreactor and a height of a source of the concentrate are arranged to reduce a height difference between the source and the destination, and/or to reduce a pumping head requirement of at least one pump.

Clause 27: the method of clause 18, wherein a permeation flux of the filtering element is between 200 $L/(m^2h)$ to 5,000 $L/(m^2h)$, and a pressure difference across the filtering element is less than 5900 Pa.

Clause 28: the method of any one of clauses 1-27, wherein at least one pump discharges into the bioreactor.

Clause 29: the method of clause 18: wherein the permeation flux of the filtering element is greater than 500 $L/(m^2h)$, such as greater than 1,000 $L/(m^2h)$, such as greater than 2,500 $L/(m^2h)$, such as greater than 5,000 $L/(m^2h)$.

Clause 30: the method of any one of clauses 1-29, wherein the filtering step increases the total suspended solids in the adjacent volume above that of the source of the influent directly from the bioreactor.

Clause 31: the method of any one of clauses 1-30, wherein the filtering step increases the total suspended solids in the adjacent volume to greater than or equal to 10 g/L, such as greater than or equal to 12 g/L, such as greater than or equal to 15 g/L, such as greater than or equal to 20 g/L, such as greater than or equal to 50 g/L.

Clause 32: the method of clause 26, wherein the pumping head is less than or equal to 2 m, such as less than or equal to 1 m, such as less than or equal to 0.5 m, such as less than or equal to 0.2 m.

Clause 33: the method of any one of clauses 1-32, wherein at least one pump has a head less than or equal to 2 m, such as less than or equal to 1 m, such as less than or equal to 0.5 m, such as less than or equal to 0.2 m.

Clause 34: the method of any one of clauses 1-33, wherein the untreated waste water is pumped by a single pump.

Clause 35: the method of any one of clauses 1-34, wherein a destination of the concentrate is an anoxic zone of the bioreactor.

Clause 36: the method of any one of clauses 1-34, wherein a destination of the concentrate is a combined anoxic and denitrification zone.

Clause 37: the method of any one of clauses 1-34, wherein a destination of the concentrate is a bioreactor which is not supplying the untreated waste water to the filter machine.

Clause 38: the method of any one of clauses 1-37, wherein the filter machine is located in the bioreactor.

Clause 39: the method of any one of clauses 1-37, wherein the filter machine is located in a separate tank from the bioreactor.

Clause 40: the method of clause 18, wherein the filtering elements are at least partially submerged in the treated waste water.

Clause 41: the method of any one of clauses 1-40, wherein the untreated waste water is supplied to a separate tank from the bioreactor tank and the concentrate is sourced from adjacent to the filter machine and is pumped to an anoxic zone of a combined anoxic zone and denitrification zone.

Clause 42: the method of clause 41, wherein the untreated waste water supplied to the separate tank is supplied from the bioreactor by means of gravity or pumping.

Clause 43: the method of clause 19, wherein the filter machine is located in a separate tank to the bioreactor, and integrated with an existing conventional activated sludge treatment plant, which has a bioreactor tank and a clarifier.

Clause 44: the method of clause 19, wherein the filter machine is located in a separate tan to the bioreactor, and integrated with an existing conventional activated sludge treatment plant, which has a bioreactor and a clarifier, and concentrate is sourced adjacent to the filter machine and is pumped to a destination.

Clause 45: the method of clause 19, wherein the filter machine is located in a separate tan to the bioreactor, and integrated with an existing conventional activated sludge treatment plant, which has a bioreactor and a clarifier, and concentrate is sourced adjacent to the filter machine and is pumped to a destination and untreated waste water is supplied to the clarifier and the separate tank.

Clause 46: the method of clause 19, wherein a destination of the concentrate, sourced from adjacent to the filter machine, is an anoxic zone or a combined anoxic and denitrification zone.

Clause 47: the method of any one of clause 43-45, wherein the conventional activated sludge treatment plant's existing pump, attached to the clarifier, pumps concentrate to the denitrification zone.

Clause 48: the method of clause 43-45, wherein the conventional activated sludge treatment plant's nitrification zone is maintained at its originally design operating point in terms of total suspended solids, such as between 3.5 g/L to 4 g/L.

Clause 49: the method of clause 19, wherein the filter machine is at least partially submerged in a separate tank and is used to process higher than normal input flow rates of water.

Clause 50: the method of clause 19, wherein the total suspended solids of the concentrate are adjusted adjacent to the filter machine.

Clause 51: the method of clause 19, wherein the total suspended solids of the concentrate is increased adjacent to the filter machine when the inflow to the bioreactor increases.

Clause 52: the method of clause 19, wherein a ratio between higher inflow total suspended solids level and the normal total suspended solids level measured adjacent to the filter machine is greater than of equal to 1.05, such as greater than or equal to 1.1, such as greater than or equal to 1.2, such as greater than or equal to 1.5, such as greater than or equal to 2.

Clause 53: the method of any one of clause 1-52, wherein a total suspended solids in an anoxic zone or anoxic and denitrification zone is increased during the higher inflow and/or preparation for the higher inflow.

Clause 54: the method of any one of clauses 1-53, wherein a ratio of high inflow total suspended solids to normal inflow total suspended solids at the anoxic zone or anoxic and denitrification zone is greater than or equal to 1.05, such as greater than or equal to 1.1, such as greater than or equal to 1.2, such as greater than or equal to 1.5, such as greater than or equal to 2.

Clause 55: the method of any one of clauses 1-54, wherein the flow of untreated waste water inflow to the bioreactor increases from the normal level by a factor of greater than or equal to 1.5, such as greater than or equal to 2, such as greater than or equal to 4, such as greater than or equal to 6.

Clause 56: the method of any one of clauses 1-55, wherein the flow of filtrate leaving the filter machine increases from the normal level by a factor greater than or equal to 1.5, such as greater than or equal to 2, such as greater than or equal to 4, such as greater than or equal to 6.

Clause 57: the method of any one of clauses 1-56, wherein higher inflow of untreated waste water is predicted using rain forecasts.

Clause 58: the method of any one of clauses 1-57, wherein higher inflow of untreated waste water is predicted using rain forecasts and a model of the rainfall's impact on inflow.

Clause 59: the method of any one of clauses 1-58, wherein a weather forecast and/or model is applied in software on a suitable platform with computational and data handling and control.

Clause 60: the method of clause 59, wherein the output of the model is used to advise the operators to adjust the operation of the process in preparation for the rainfall and/or during the rain fall and in preparation for the end of the higher inflow to switch back to the normal operation mode.

Clause 61: the method of clause 59, wherein the output of the model is used to automatically adjust the operation of the progress in preparation for the rainfall and/or during the rainfall and in preparation for the end of the higher inflow to switch back to the normal operation mode.

Clause 62: the method of clause 19, wherein the filter machine is in a separate tank and is not operated during normal inflow operating conditions, but is operated when higher flow occurs.

Clause 63: the method of any one of clauses 1-62, wherein a network of filter machines and bioreactors are piped together.

Clause 64: the method of any one of clauses 1-63, wherein the inflow to the bioreactor is pre-treatment filtrate from a pre-treatment filter machine which is partially submerged in the pre-treatment tank.

Clause 65: the method of clause 19, wherein the filter machine is within the bioreactor and concentrate is pumped adjacent to a post pretreatment inflow to the bioreactor.

Clause 66: the method of clause 64, wherein the pre-treatment tank and the bioreactor are arranged so the feed or pre-treatment inflow and the filtrate are located at one end and/or the tanks are arranged in a U-shape.

Clause 67: A computer program which, when executed by a computer, causes the computer to perform the method of any one of clauses 1-66.

Clause 68: A computer program product comprising a computer-readable medium, which may be non-transitory, and the computer program of clause 6 stored on the computer-readable medium.

Clause 69: A waste water treatment plant for processing waste water, comprising: a bioreactor comprising: an inlet zone for containing untreated wastewater and a concentrate, and an aeration zone with gas feeders, a filter for generating a filtrate and a concentrate, and a mechanism to transfer the concentrate from the filter to the inlet zone.

Clause 70: The waste water treatment plant of clause 69, wherein the mechanism comprises a pump and at least one transfer pipe between the filter and the inlet zone.

Clause 71: The waste water treatment plant of any one of clauses 69-70, wherein the transfer pipe comprises an untreated waste water inlet.

Clause 72: The waste water treatment plant of any one of clauses 69-71, wherein the mechanism is a differential height between the inlet zone and an external tank provided for the filter.

Clause 73: The waste water treatment plant of any one of clauses 69-72, further comprising a contactor having an inlet from a waste water inlet and an inlet from a transfer pipe.

Clause 74: The waste water treatment plant of any one of clauses 69-73, wherein the filter is a filter machine comprising a permeable substrate and wherein the permeable substrate is deliberately fouled to form a layer of deposited suspended solids from the treated waste water so as to achieve the concentrate with the at least 10,000 mg/L of total suspended solids.

Clause 75: The waste water treatment plant of clauses 69-73, wherein the filter is a filter machine comprising a permeable substrate and wherein the permeable substrate is deliberately fouled to form a layer of deposited suspended solids from the treated waste water so as to achieve the concentrate with the at least 10,000 mg/L and below 70,000 mg/L of total suspended solids.

Clause 76: The waste water treatment plant of any one of clauses 69-73, wherein the filter is a filter machine comprising a permeable substrate and wherein the permeable substrate is deliberately fouled to form a layer of deposited suspended solids from the treated waste water so as to achieve the concentrate with the at least 10,000 mg/L and below 50,000 mg/L of total suspended solids.

Clause 77: The waste water treatment plant of any one of clauses 69-73, wherein the filter is a filter machine comprising a permeable substrate and wherein the permeable substrate is deliberately fouled to form a layer of deposited suspended solids from the treated waste water so as to achieve the concentrate with the at least 15,000 mg/L and below 25,000 mg/L of total suspended solids.

Clause 78: The waste water treatment plant of any one of clauses 69-77, wherein the bioreactor comprises a single tank.

Clause 79: The waste water treatment plant of any one of clauses 69-77, wherein the bioreactor comprises a plurality of tanks which are interconnected.

Clause 80: The waste water treatment plant of clause 69, wherein the filter is a filter machine.

Clause 81: The waste water treatment plant of clause 80, wherein the filter machine comprises a liquid-permeable filtering element comprising a first face and a second face opposite of the first face, wherein the liquid-permeable filtering element is at least partially submerged in a liquid.

Clause 82: The waste water treatment plant of clause 81, wherein the liquid-permeable filtering element is arranged to be cycled through the liquid such that: in a first position, an area of the first face of the filtering element is subject to liquid under pressure and a pressure across the filtering element greater than 0 and less than or equal to 5.9 kPa; and in a second position, the area is not subjected to liquid under pressure or is subjected to liquid at a lower pressure.

Clause 83: The waste water treatment plant of clause 80 or 81, wherein the filter machine comprises at least one nozzle that directs at least one jet at the second face of the filtering element, through the filtering element, and towards the first face of the filtering element to remove and/or aid in removal of solids accumulated on the first face of the filtering element.

Clause 84: The waste water treatment plant of any one of clauses 80-83, wherein the filter machine is configured to filter liquid having total suspended solids of between 1,000 mg/L and 50,000 mg/L so as to produce filtered liquid having total suspended solids of no more than 10 mg/L.

Clause 85: The waste water treatment plant of clause 81, wherein the filtering element is configured to be cycled at a speed such that a permeation flux is between 200 L/(m$^2$h) to 5,000 L/(m$^2$h) and a thickness of a layer of accumulated solids when the filtering element reaches the second position is between 0 and 6 cm.

Clause 86: The waste water treatment plant of clause 81, wherein a pore size of the filtering element is between 2 and 40 μm.

Clause 87: The waste water treatment plant of any one of clauses 69-86, further comprising: at least one gas feeder to introduce gas bubbles into the treated waste water.

Clause 88: The waste water treatment plant of any one of clauses 69-87, wherein the concentrate has a total suspended solids in the range of 10,000 mg/L to 50,000 mg/L.

Clause 89: The waste water treatment plant of any one of clauses 69-88, wherein the concentrate has a total suspended solids in the range of 15,000 mg/L to 25,000 mg/L.

Clause 90: The waste water treatment plant of any one of clauses 69-89, further comprising: at least one pump configured to transfer the concentrate to the bioreactor.

Clause 91: The waste water treatment plant of clause 85, wherein the permeation flux of the filtering element is between 500 L/(m$^2$h) to 5,000 L/(m$^2$h).

Clause 92: The waste water treatment plant of any one of clauses 69-91, further comprising a biological treatment of the untreated waste water; wherein the biological treatment comprises: flocculation of an influent, nitrification, an anoxic zone, denitrification, or a combination thereof.

Clause 93: The waste water treatment plant of any one of clauses 69-92, wherein a level of dissolved oxygen in the concentrate is no more than 0.5 mg/L, preferably no more than 0.1 mg/L.

Clause 94: The waste water treatment plant of any one of clauses 69-93, wherein a level of nitrate ($NO_3$) in the concentrate is no more than 3 mg/L.

Clause 95: The waste water treatment plant of any one of clauses 69-94, wherein a height of a destination of the concentrate in the bioreactor and a height of a source of the concentrate are arranged to reduce a height difference between the source and the destination, and/or to reduce a pumping head requirement of at least one pump.

Clause 96: The waste water treatment plant of any one of clauses 69-95, wherein the filter is a filtering/thickening machine comprising a filter material or an alternative machine comprising a filter material, wherein a permeation flux of the filter is between 200 L/(m$^2$h) to 5000 L/(m$^2$h), a pressure difference across the filter material is less than 5900 Pa.

Clause 97: The waste water treatment plant of clause 96, wherein the permeation flux of the filter material is equal or greater than 500 L/(m$^2$h), equal or greater than 1000 L/(m$^2$h), equal or greater than 2500 L/(m$^2$h), equal or greater than 5000 L/(m$^2$h).

Clause 98: The waste water treatment plant of any one of clauses 69-97, wherein a level of dissolved oxygen in the concentrate is equal to 0 mg/L.

Clause 99: The waste water treatment plant of any one of clauses 69-98, wherein a level of nitrate in the concentrate is less than or equal to 8 mg/L.

Clause 100: The waste water treatment plant of clause 96, wherein the filtering/thickening machine increases the total suspended solids in an adjacent volume to the machine above that of the source of the untreated waste water Clause 101: The waste water treatment plant of clause 100, wherein filtering/thickening machine increases the total suspended solids in the adjacent volume to greater or equal to 10 g/L, greater or equal to 12 g/L, greater or equal to 15 g/L, greater or equal to 20 g/L, greater or equal to 50 g/L.

Clause 102: The waste water treatment plant of any one of clauses 69-101, wherein a height difference between a source and destination of the concentrate is less than or equal to 2 m, less than or equal to 1 m, less than or equal to 0.5 m, or less than equal to 0.2 m.

Clause 103: The waste water treatment plant of any one of clauses 69-102, wherein at least one pump has a head less than or equal to 2 m, less than or equal to 1 m, less than or equal to 0.5 m, or less than equal to 0.2 m.

Clause 104: The waste water treatment plant of any one of clauses 69-103, wherein the untreated waste water is pumped by a single pump.

Clause 105: The waste water treatment plant of any one of clauses 69-104, wherein the destination of the concentrate is the anoxic zone (AN) of the bioreactor.

Clause 106: The waste water treatment plant of any one of clauses 69-104, wherein the destination of the concentrate is the combined anoxic and denitrification zone (AN/DN) of the bioreactor tank.

Clause 107: The waste water treatment plant of any one of clauses 69-104, wherein the destination of the concentrate is a bioreactor which is not supplying the untreated waste water to the filter.

Clause 108: The waste water treatment plant of clause 81, wherein the filtering elements are at least partially immersed in the influent of the bioreactor.

Clause 109: The waste water treatment plant of any one of clauses 69-108, wherein the untreated waste water supplied to a separate tank is supplied from a bioreactor tank and the concentrate, sourced from adjacent to the filter is pumped to an anoxic zone of the bioreactor the combined anoxic and denitrification zone of the bioreactor.

Clause 110: The waste water treatment plant of any one of clauses 69-109, wherein the untreated waste water supplied to a separate tank is supplied from the bioreactor by means of gravity or pumping.

Clause 111: The waste water treatment plant of any one of clauses 69-110, further comprising a conventional activated sludge (CAS) treatment plant, wherein the filter is located in a separate tank to the bioreactor, and integrated with an existing conventional activated sludge (CAS) treatment plant, which has a bioreactor and a clarifier.

Clause 112: The waste water treatment plant of any one of clauses 69-110, further comprising a conventional activated sludge (CAS) treatment plant, wherein the filter is located in a separate tank to the bioreactor, and integrated with an existing conventional activated sludge (CAS) treatment plant, which has a bioreactor and a clarifier, and the concentrate sourced adjacent to the filter machine is pumped to a destination.

Clause 113: The waste water treatment plant of any one of clauses 69-110, further comprising a conventional activated sludge (CAS) treatment plant, wherein the filter is located in a separate tank to the bioreactor, and integrated with an existing conventional activated sludge (CAS) treatment plant, which has a bioreactor and a clarifier, and the concentrate sourced adjacent to the filter machine is pumped to a destination and untreated waste water is supplied to the clarifier and the separate tank.

Clause 114: The waste water treatment plant of any one of clauses 111-113, wherein the destination of the concentrate, sourced from adjacent to the filter, is an anoxic zone of the bioreactor or an combined anoxic and denitrification zone (AN/DN) of the bioreactor.

Clause 115: The waste water treatment plant of any one of clauses 69-114, further comprising a conventional activated sludge (CAS) treatment plant, wherein the CAS treatment plant's existing pump that is attached to a sedimentation system or clarifier pumps the concentrate to the denitrification zone DN.

Clause 116: The waste water treatment plant of any one of clauses 69-114, further comprising a conventional activated sludge (CAS) treatment plant, wherein the CAS system's nitrification zone of the bioreactor is maintained at its originally designed operating point in terms of TSS between 3.5 to 4 g/L or between 3 and 5 g/L.

Clause 117: The waste water treatment plant of any one of clauses 69-116, wherein the filter is at least partially immersed in a separate tank or a bioreactor tank and is used to process higher than normal input flowrates of raw water.

Clause 118: The waste water treatment plant of any one of clauses 69-117, wherein the total suspended solids is adjusted adjacent to the filter.

Clause 119: The waste water treatment plant of any one of clauses 69-118, wherein the total suspended solids is adjusted adjacent to the filter when the inflow to the bioreactor increases.

Clause 120: The waste water treatment plant of any one of clauses 69-119, wherein a ratio between higher inflow total suspended solids level and the normal total suspended solids level measured adjacent to the filter is greater or equal to 1.05, greater or equal to 1.1, greater or equal to 1.2, greater or equal to 1.5, greater or equal to 2.

Clause 121: The waste water treatment plant of any one of clauses 69-120, wherein the total suspended solids in an anoxic or anoxic/denitrification zones is increased during the higher inflow and/or in preparation for the higher inflow.

Clause 122: The waste water treatment plant of any one of clauses 69-121, wherein ta ratio of high inflow total suspended solids to normal inflow total suspended solids at an anoxic or anoxic/denitrification zones is greater or equal to 1.05, greater or equal to 1.1, greater or equal to 1.2, greater or equal to 1.5, greater or equal to 2.

Clause 123: The waste water treatment plant of any one of clauses 69-122, wherein the flow of untreated waste water inflow to the bioreactor increases from the normal level by a factor greater than or equal to 1.5, greater than or equal to 2, greater than or equal to 4 greater than or equal to 6.

Clause 124: The waste water treatment plant of any one of clauses 69-123, wherein the filtrate leaving the filter increases from the normal level by a factor greater than or equal to 1.5, greater than or equal to 2, greater than or equal to 4 greater than or equal to 6.

Clause 125: The waste water treatment plant of any one of clauses 69-124, wherein the higher inflow is predicted using rain forecasts and/or models based on historical weather data and/or daily inflow patterns.

Clause 126: The waste water treatment plant of any one of clauses 69-125, wherein the higher inflow is predicted using rain forecasts and/or historical weather data and/or daily inflow patterns and a model of the impact on inflow is used.

Clause 127: The waste water treatment plant of any one of clauses 69-126, wherein a weather forecast and/or historical weather data and/or daily inflow patterns and a model may be applied in software on a suitable platform with computational and data handling and/or control.

Clause 128: The waste water treatment plant of clause 127, wherein the output of the model is used to advise the operators to adjust the operation of the process in preparation for the rainfall and/or during the rain fall and in preparation for the end of the higher inflow to switch back to the normal operation model.

Clause 129: The waste water treatment plant of clause 128, wherein the output of the model is used to automatically adjust the operation of the process in preparation for the rainfall and/or during the rain fall and in preparation for the end of the higher inflow to switch back to the normal operation mode and/or using historical weather data and/or daily inflow patterns.

Clause 130: The waste water treatment plant of any one of clauses 69-129, wherein the filter is in a separate tank and is not operated during normal inflow operating conditions, but is operated when higher than ADF occurs.

Clause 131: The waste water treatment plant of any one of clauses 69-130, wherein a network of filters and bioreactors are piped together.

Clause 132: The waste water treatment plant of any one of clauses 69-131, wherein the inflow to the bioreactor is a pre-treatment filtrate from a pre-treatment filter which is at least partially immersed in a pre-treatment tank.

Clause 133: The waste water treatment plant of any one of clauses 69-132, wherein the filter is at least partially immersed within the bioreactor and the concentrate is pumped adjacent to the inflow to the bioreactor by at least one pump.

Clause 134: A system, comprising: the waste water treatment plant of any one of claims 68-132; a set of one or more sensors configured to monitor the waste water treatment plant; a set of one or more actuators, a set of one or more motors and pumps, or a combination thereof, configured to control the waste water treatment plant; a set of one or more computer systems configured to receive a signal from the set of one or more sensors and to provide control signals to control the set of one or more actuators, the set of one or more motors and pumps, or the combination thereof.

Clause 135: The system of clause 134, wherein the computer system(s) is arranged to control the process of the treatment plant.

Clause 136: The system of clause 134 or 135, wherein the computer system(s) is arranged to control the process of the treatment plant and/or at least one pump which pumps concentrate from adjacent to filter, wherein the concentrate has a concentration of dissolved oxygen (DO), a concentration of nitrates ($NO_3$), a level of total suspended solids and/or the concentrations and/or the level of total suspended solids are controlled and/or monitored.

Clause 137: The method of clause 2, wherein the combining step further comprises actively mixing the untreated waste water and the concentrate of treated wasted waste water with at least 10,000 mg/L of total suspended solids to form the biological active mixture.

Clause 138: The method of clause 2, wherein the combining step further comprises combining the untreated waste water and the concentrate of treated wasted waste water with at least 10,000 mg/L of total suspended solids in a transfer pipe to form the biological active mixture.

Clause 139: The method of clause 2, further comprising introducing untreated waste water into the inlet zone of the bioreactor.

DESCRIPTION OF THE INVENTION

Figure 1:
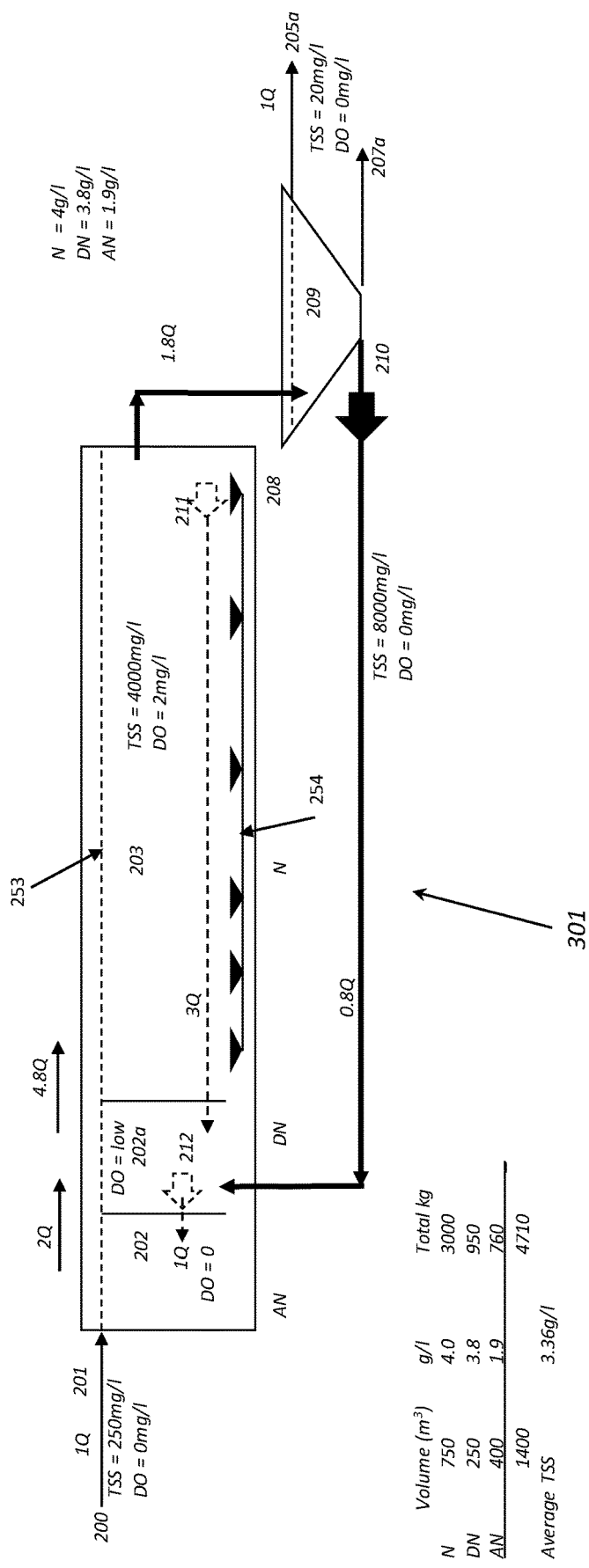
FIG. 1 is a schematic diagram of a CAS treatment plant known in the art.
Figure 2:
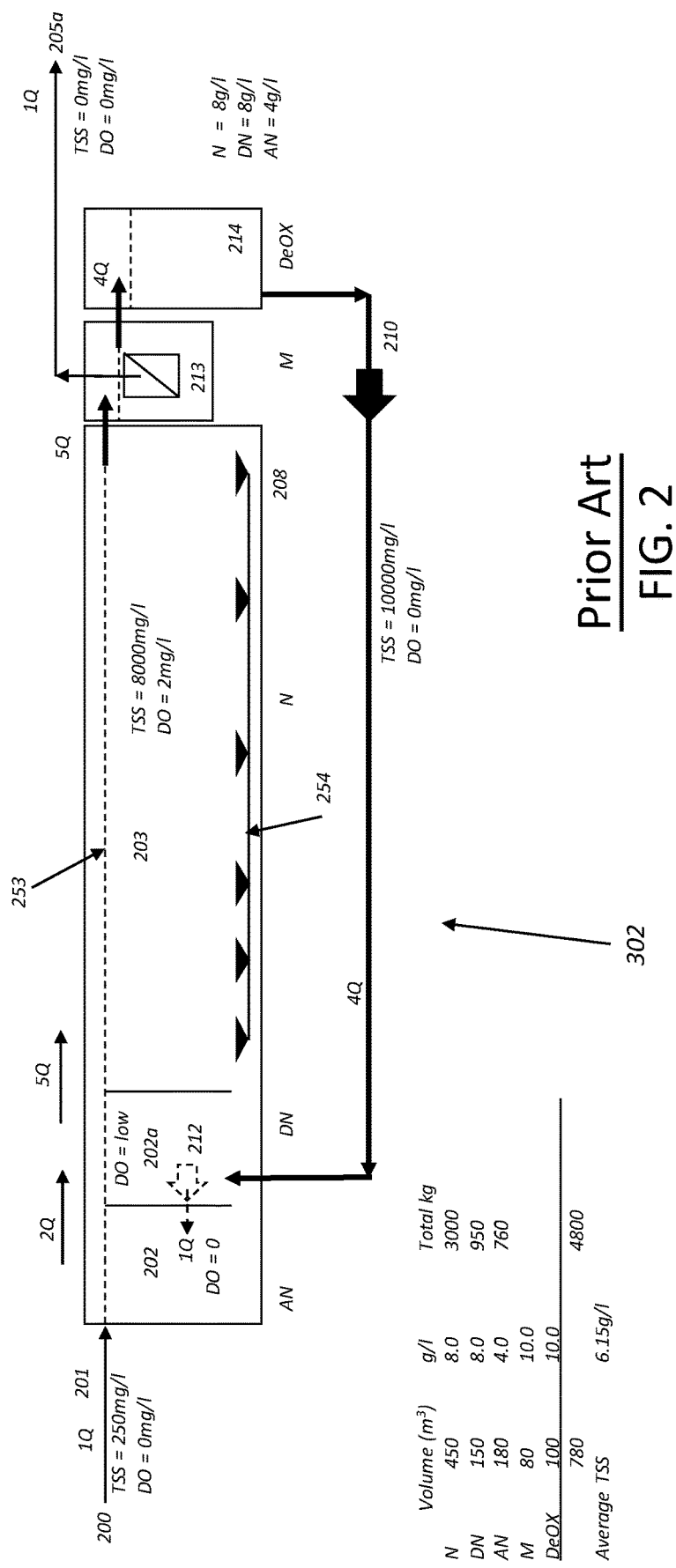
FIG. 2 is a schematic diagram of a MBR treatment plant known in the art.

For purposes of the description hereinafter, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

According to certain non-limiting embodiments of the present invention, a process and/or system for the treatment of waste water is provided, where the processes and/or systems may include a machine for filtering a liquid, such as a filtering/thickening machine (FTM). A filtering/thickening machine (FTM) may also be referred to herein as simply a "filter machine (204)". One possible version of the FTM is substantially described in Italian Patent Application Numbers 102018000010259, filed Nov. 12, 2018; 102018000010430, filed Nov. 19, 2018; 102019000011046, filed Jul. 5, 2019; and 102019000011058, filed Jul. 5, 2019.

A preferred non-limiting embodiment of an FTM can be found in PCT Application Number PCT/EP2019/074913, filed Sep. 17, 2019, which is hereby incorporated by reference in its entirety. The FTM used in the processes and systems disclosed herein may include a rotating disc filter machine, such as that disclosed in PCT/EP2019/074913. The FTM uses a mesh, substrate, or filtering material to facilitate the separation of biological suspended solids from the influent to provide filtered liquid or effluent with suspended solids. The quality of the effluent or filtered liquid from the FTM is almost equivalent to that of a MBR. The FTM enables significant removal of bacterial and viruses to acceptable levels to meet reuse quality required, such as for irrigation and washing. The FTM provides a quality of effluent or filtered liquid or filtrate (205) associated with an equivalent nominal pore size of between 0.04 and 0.4 microns despite the FTM's substrate or filtering material having a mesh free passage of 2 to 40 microns. Thus, the FTM is able to provide superior flux rates. The filtering of the water may be performed by permeable filtering element having a first face and a second face opposite of the first face, wherein at least an area of the first face of the filtering element is subject to treated waste water under pressure and a pressure across said area is greater than 0 and less than or equal to 5.9 kPa, wherein a layer of deposited solids or concentrate is accumulated on the first face of the filtering element.

The FTM relies on an effective deliberate fouling of a substrate (also referred to as a filter substrate, or filter material) to form a temporary dynamic layer made of deposited suspended solids from the influent to the filter machine (or referred to as the treated waste water)(250). The FTM controls the balance between the deposition of solids from the "influent to the filter machine" (250) on to the FTM's filter material, the compactions of said solids on the FTM's filter material and the return of the solids in to the liquid in the region (252) adjacent to the FTM to the filter machine to form a concentrate, a portion is used as RAS (251). RAS (251) is the portion of the concentrate transferred to the inlet zone of the bioreactor (208). The concentrate is also referred to as the concentrate of the treated wastewater. The return of the solids provides the FTM with its ability to thicken the influent to the filter machine or the treated waste water. High quality effluent (also referred to as filtrate) can be produced economically as compared to any state of the art treatment systems.

Integrated FTM Treatment Plant

Figure 3:
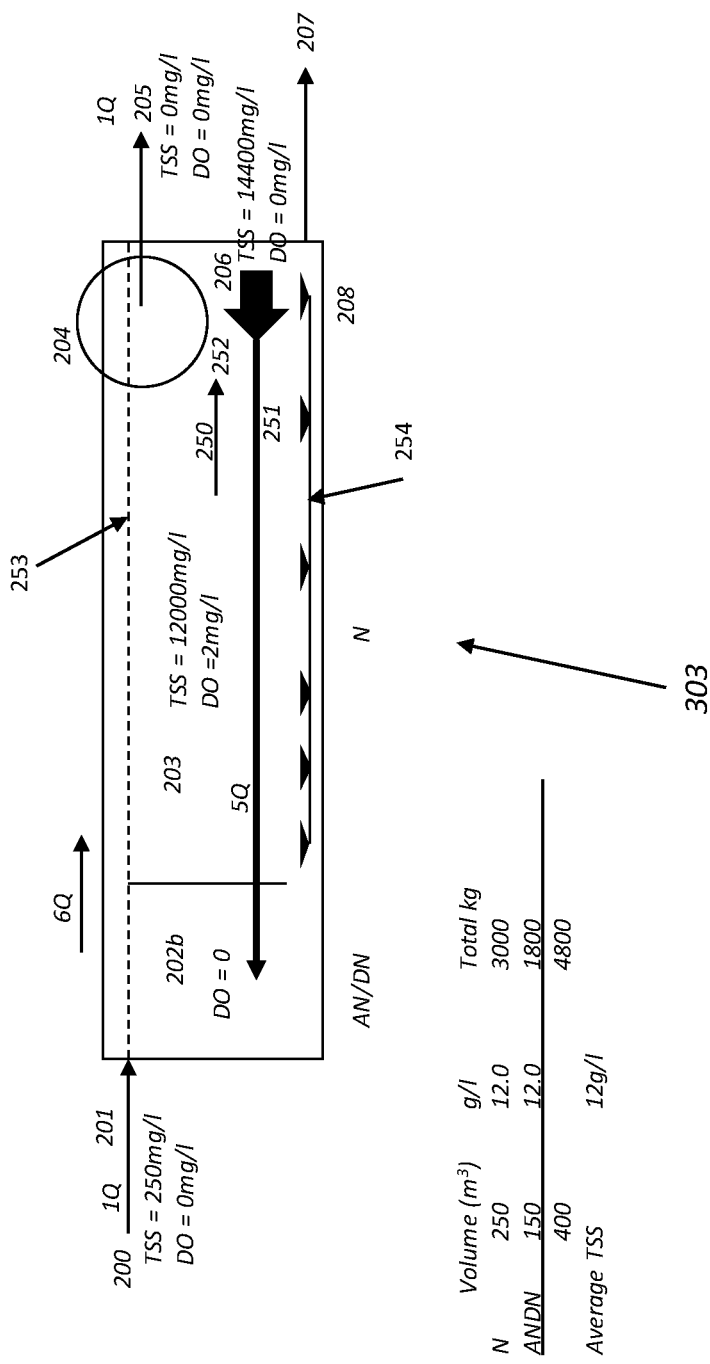
FIG. 3 is a schematic diagram of an integrated FTM treatment plant according to one aspect of the present invention.

Referring to FIG. 3, an Integrated FTM Treatment Plant (303) is provided. The Integrated FTM Treatment plant (303) includes an FTM (also referred to as a filter machine) (204) integrated directly in a bioreactor (208), which may be made of concrete or another material. The bioreactor (208) described herein may be a single tank; or alternatively, may comprise a plurality of tanks which are interconnected. The plurality of tanks may be interconnected by a plurality of tubing or piping (not shown). The FTM (204) is positioned in a nitrification tank (203) at the opposite end of the bioreactor (208) to a waste water input (201). The untreated waste water (200) (also referred to as waste water) entering at the waste water input (201) may have a TSS of 250 mg/L and DO of 0 mg/L. The flow rate of liquid in terms of (Q) at various points in processing are shown in FIG. 3. This enables the bioreactor process prior to the FTM (204) to perform a denitrification process (DN), a nitrification process (N) and/or to process the phosphate removal (AN) prior to the processed liquid or (treated waste water) (250), having a level (253), reaching the FTM (204). Thickened activated sludge or concentrate from a region adjacent (252) to the FTM (204) is pumped with a pump (206) to an inlet zone, such as an anoxic/anaerobic zone (202b) adjacent to the waste water input (201) and is mixed with untreated waste water (200) to form a biological active mixture. The region adjacent to the waste water input (201) within the bioreactor is referred to as the inlet zone. The inlet zone of any of the treatment plants described herein may be configured to aerate the liquid contained therein or to be adjacent to the aeration zone. Alternatively, the inlet zone may be within or adjacent to a non-aerating zone. The non-aerating zone may be an anoxic zone. In the anoxic/anaerobic zone (202b), the thickened activated sludge has a DO content of 0 mg/L. A specific contactor may be used that facilitates highly turbulent mixing of the RAS or concentrate of treated waste water (251) with the untreated waste water (200) entering at the waste water inlet (201) to form the biological active mixture. Alternatively, or in addition, the untreated waste water (200) and the concentrate (251) may be at least partially mixed at some region upstream from the inlet zone, such as in a pipe transferring the concentrate to the inlet of the bioreactor. The biological active mixture may contain other liquids in addition to untreated waste water (200) and concentrate (251).

RAS (251) may be referred to as "concentrate" which are the suspended solids that aggregate during filtration of the treated waste water. During filtration, the treated waste water is split into a concentrate of the suspended solids (251) and an effluent (205) or "filtrate". As such, the waste water enters the system as untreated waste water (200), is treated in an aeration zone, and/or other biological treatments, to produce treated waste water, and is then filtered to produce a concentrate (251) and a filtrate (205).

The dewatering of the solids on the FTM filter material yields a (TSS) solids content of 14,000-25,000 mg/L, or 10,000 to 70,000 mg/L and a DO=0 mg/L or below 0.1 mg/L in the liquid (i.e. the concentrate) adjacent (252) to the FTM (204), which is significantly larger than can be achieved with CAS and MBR. The high level of TSS in the liquid adjacent (252) to the FTM (204) is accomplished by mixing the solids removed from the influent (250) by the filter machine (204) with a small quantity of effluent (205)(not shown) and then reintroducing said mixture into the liquid which mixes with the liquid adjacent (252) to the filter machine. The FTM (204) provides clean effluent (also referred to as effluent, filtrate and clean water) (205) with less than 10 mg/L TSS and approximately 0 mg/L DO. As used herein, "effluent" refers to clean water (such as clean waste water) or other liquid having a total suspended solids content of less than 25 mg/L. Effluent may also be referred to as "filtrate". Part of the high-solid-content sludge is separately collected (207) and wasted to maintain stable conditions in the plant. The removal process may or may not be a continuous process.

The ability of the new system to work with solids concentrations in the nitrification zone in excess of 12,000 mg/L compared to 4,000 mg/L for CAS and 8,000 mg/L for MBR constitutes a huge advantage over the existing state of the art. The DO content also increases to 2 mg/L in the nitrification zone. To achieve the same total amount of suspended solids, the present invention requires a nitrification zone that is approximately 60% in volume with respect to the same MBR nitrification zone or 33% in volume with respect to the same CAS nitrification zone.

Surprisingly, working at even higher solid content in the proximity of the FTM (204), in the range 14,000-25,000 mg/L, offers additional benefits that make the present invention even more competitive with respect to other known techniques. To achieve effective aeration in an aeration zone (e.g., the nitrification zone (203)) of the bioreactor (208) by means of an aeration system (254), the common approach would be to keep the TSS concentration below 10,000 mg/L, as it is known that at higher solid contents the oxygen transfer between air bubbles and water becomes less efficient as shown in the Gunder curve of FIG. 5. The Gunder curve shows Alpha (the ratio of the oxygen transfer into the process water compared to oxygen transfer into clean water) plotted against MLSS (mixed liquor suspended solids) (g/L) The influent (200), or untreated waste water, or partly treated waste water is aerated in the aeration zone, such as in the nitrification zone (203) to remove dissolved gas and volatile organic compounds. The influent to the filter machine may be referred to as "treated" waste water (250) after aeration in the aeration zone and may then be filtered to produce a filtrate (effluent) (205) and concentrate (251).

The mass balance of TSS for the FTM plant of FIG. 3 is shown in Table 3 below.

TABLE 3

| Zone | Volume (m^3) | g/L | Total kg |
|---|---|---|---|
| N | 250 | 12.0 | 3000 |
| AN DN | 150 | 12.0 | 1800 |
| Total | 400 | | 4800 |
| Average TSS | | 12.0 | |

It is an aim of this invention to disclose a treatment process that works in the opposite regime, achieving a high solid content, of greater than 10,000 mg/L, such as in the range of 14,000-25,000 mg/L, in the vicinity of a FTM (204) integrated in the process.

Figure 4:
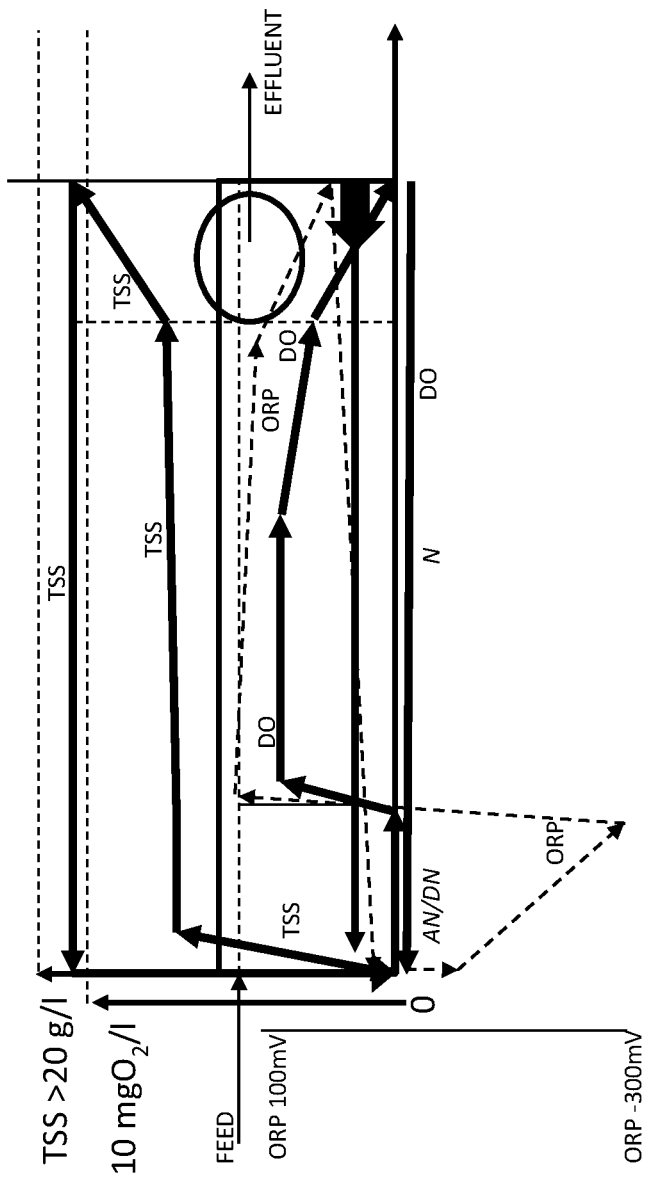
FIG. 4 is a graph showing an integrated FTM system process profile for TSS, DO, and ORP according to another aspect of the present invention.

Due to the high TSS in the vicinity of the FTM (204), the RAS (also referred to as concentrate of treated waste water) (251) is DO depleted even in the presence of aeration due to ineffective transfer of oxygen from the air bubbles to the fluid at high TSS (see FIG. 5), even if aeration is needed for the proper operation of the FTM (204). Thus, the concentrate is able to maintain a level of dissolved oxygen in the concentrate of no more than 0.5 mg/L, such as no more than 0.1 mg/L since the concentrate, as described herein, is naturally high in TSS such that oxygen does not transfer into the concentrate. As shown on the Gunder curve of FIG. 5, the Alpha factor decreases with an increase in suspended solids. A decrease in Alpha factor means that the oxygen transfer into the concentrate decreases. The concentrate is able to maintain this low level of dissolved oxygen for any of the treatment plant embodiments described herein. The present invention therefore achieves very good divergence between the DO and TSS profiles (see FIG. 4), similarly to CAS, but with even higher TSS and in a significantly smaller volume. Further, the level of nitrate in the concentrate is no more than 3 mg/L, such as no more than 2 mg/L. Due to the absence of oxygen from the low level of dissolved oxygen discussed hereinabove, the bacteria in the concentrate looks for another oxygen source (i.e., the nitrates ($NO_3$) present in the concentrate), and therefore, the level of nitrates can be maintained at the previously described levels. This low level of nitrates may be accomplished by the same means for any of the treatment processes discussed herein.

Advantageously with respect to CAS and MBR, DO and $NO_3$ depletion is achieved without the need for further treatment steps. This enables returning the RAS directly to the front of the process and gives a faster AN/DN reaction time.

Another advantage of this apparatus is that the RAS (251) has a large TSS concentration and it becomes further depleted of DO and $NO_3$ on route to the inlet zone and/or contactor and to the anoxic/anaerobic zone (202). Conveniently, this feature allows the RAS to be returned to a biological phosphorous release system coupled to denitrification in a single tank. Significantly, this AN/DN zone (202b) requires less than half the volume of the sum of the AN and DN regions in CAS or MBR.

Another unique feature of the FTM treatment plant is that the RAS pump (206) can return the activated sludge (RAS) (251) to a region of the bioreactor (208) approximately at the same hydrostatic level of the region where the RAS is collected. Therefore, the pump (206) can be a low-head pump (e.g., 20 cm head required), which is cheaper than the equivalent pump (210) in the CAS plant (301) and requires less electrical power. In addition, the low head high volume RAS pump facilitates a large recirculation but maintains a plug flow (i.e., a regime where reactions occur in a linear fashion with time) profile through the bioreactor (208). This pump (206) may be used to provide an additional control to the FTM (204) as it controls influent (250) to the FTM (204) via flow pacing. If the feed is Q then flow pacing with regard to the concentrate flow is a factor×Q. so a flow pace of 3:1 amounts to Q×3=concentrate flow. The ratio can be 0 to 10. The lower the ratio the high the TSS in concentrate.

Another advantage of the FTM treatment plant (303) is that the RAS can be routed directly to the AN/DN zone of the bioreactor (202b). Therefore the pumps (211) and (212) of the CAS plant (301) or the pump (212) of the MBR plant (302) are not needed.

Figure 6:
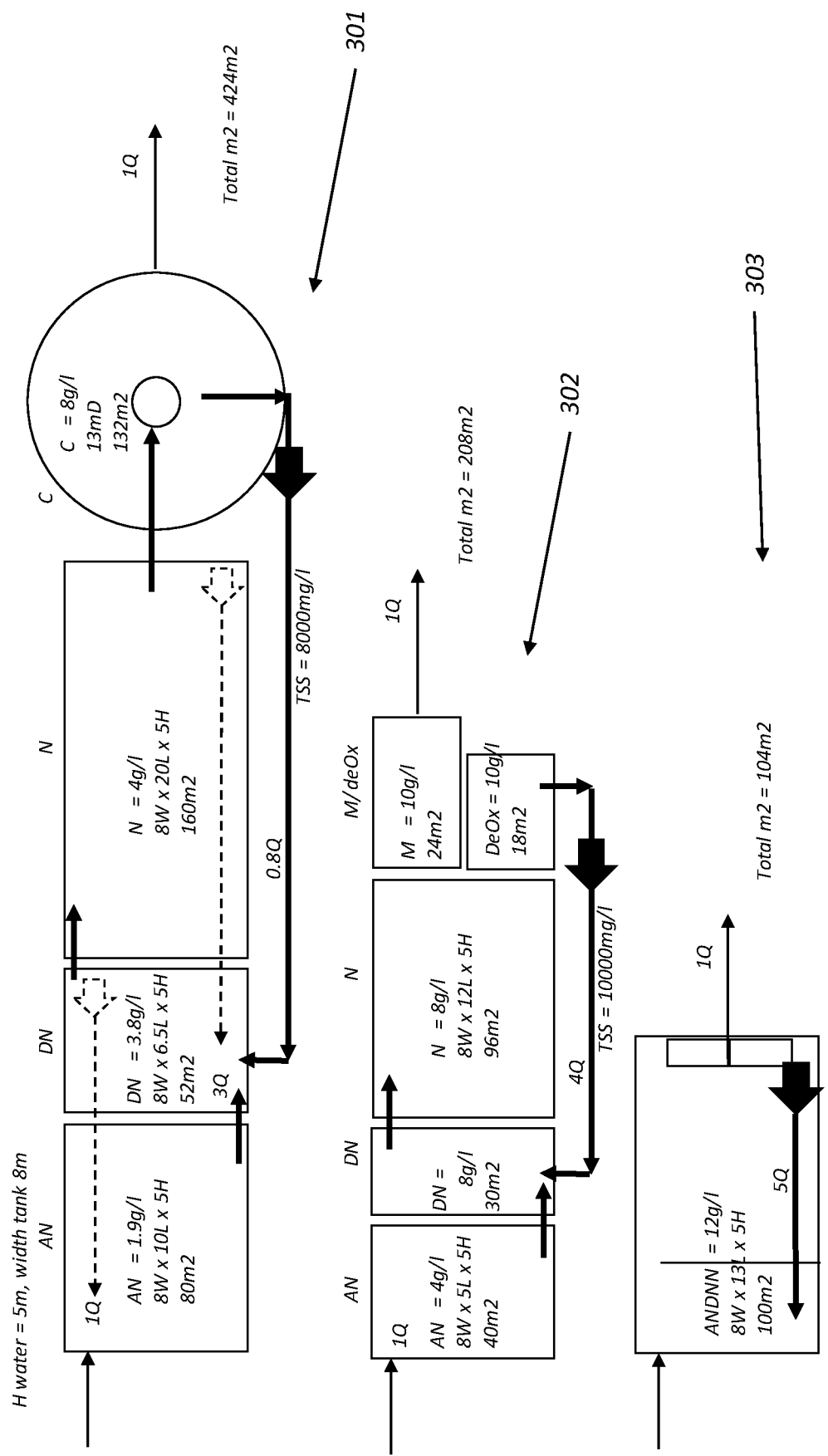
FIG. 6 is a schematic diagram of the size comparison of a CAS plant, an MBR plant, and a FTM plant, each with the same influent and effluent flows and the same amount of solids in the nitrification tank according to another aspect of the present invention.

The new treatment plant described herein therefore has significantly lower cost than CAS and MBR treatment systems. The infrastructure requires 50% the surface area of an MBR and 30% of a CAS making the construction very cost effective (a size comparison is shown in FIG. 6) while yielding an effluent quality essentially equivalent to MBR. As shown in FIG. 6, the dimensions of each plant are shown thereon.

Most advanced biological plants or CAS plants use the MLE (Modified Ludack-Ettinger), UCT (University Cape Town) or Bardenpho process designs dating back to the 1960s. Descriptions of these process designs can be found at least in "Wastewater Engineering" from Metcalf & Eddy (McGraw Hill Higher Education, 4$^{th}$ Edition, May 1, 2002, pages 1-1408). Each process step is separated and limited by RAS circulation that effectively dilutes the receiving tank.

Figure 7:
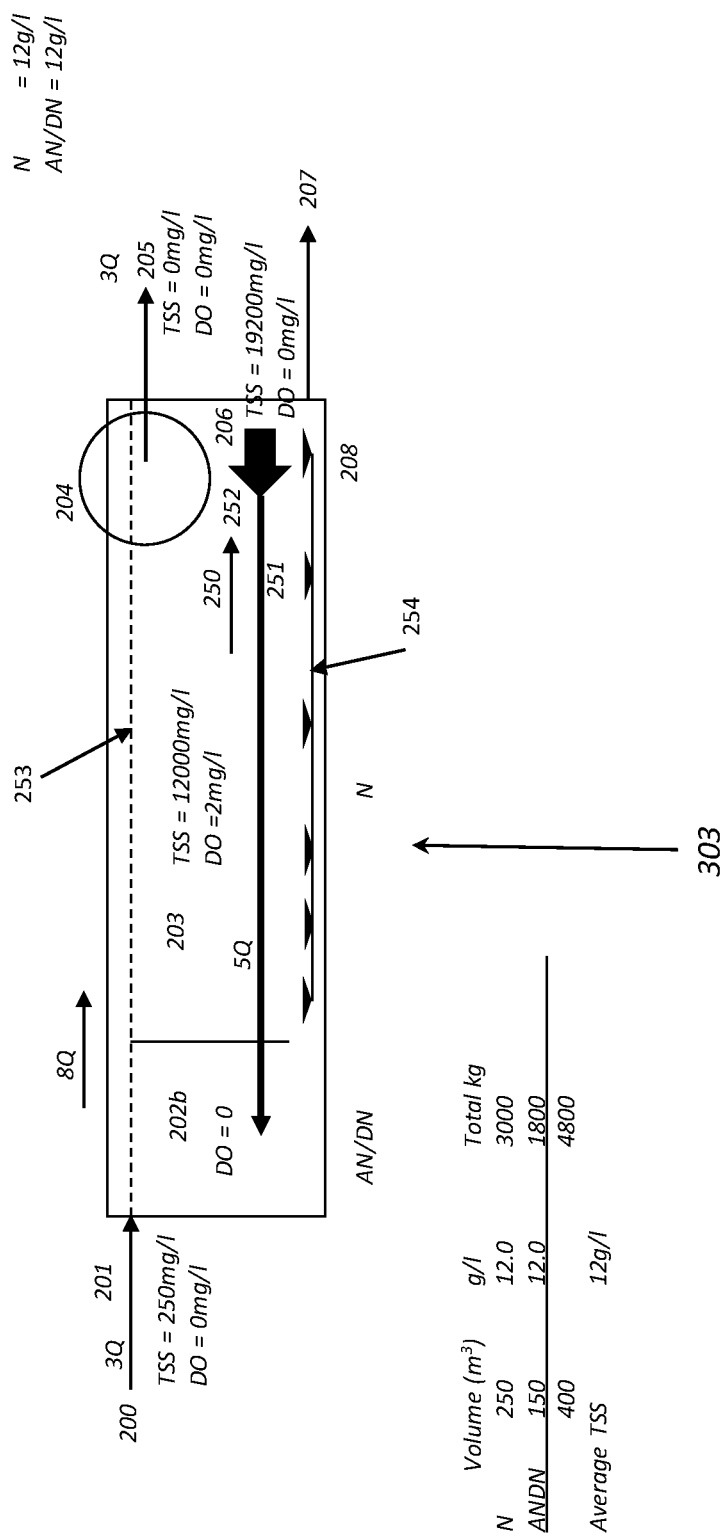
FIG. 7 is a schematic diagram of an integrated FTM system under storm-water conditions according to another aspect of the present invention.

Another major improvement with respect to the known art becomes clear when considering storm-water regimes. Typical flow rates and expected mass balances are shown in FIG. 7. In this case, the FTM (204) can cope with TSS levels that can locally exceed 20,000 mg/L in the proximity of the FTM (204) without affecting the effluent quality, while retaining low DO RAS. TSS levels of approximately 12,000 mg/L may be seen in the nitrification zone (203).

Referring to FIG. 7, untreated waste water (200) enters the bioreactor (208) through the waste water input (201) at a flow rate of 3 Q with TSS=250 mg/L and DO=0 mg/L. The untreated waste water then enters an inlet zone that optionally can be aerating, and may include an anoxic, anaerobic, and/or denitrification zone (202b). DO levels of approximately 0 may be seen at the inlet zone. In the inlet zone, the untreated waste water (200) is mixed with a concentrate (251) provided from pump (206). The liquid present in the bioreactor has a level (253) in the bioreactor (208). The mixture of untreated waste water (200) and concentrate (251) then enters an aeration zone, such as the nitrification zone (203), where it is aerated using an aeration system (254) to produce treated waste water (250). The aeration system (254) increases the DO level of the mixture to 2 mg/L and the aforementioned addition of concentrate (251) increases the TSS at the nitrification zone (203) in excess of 12,000 mg/L. The treated waste water (250) is then filtered by the filter machine (204) to produce an effluent (also referred to herein as filtrate or clean water) (205) having TSS=0 mg/L and DO=0 mg/L and a concentrate (251) having TSS of 14,000-25,000 mg/L, or 10,000 to 70,000 mg/L and DO=0 mg/L. Some of the concentrate, e.g., concentrate (252), may be separately collected (207) and removed from the bioreactor (208) to maintain stable operating conditions. The concentrate (251) may be returned to the inlet zone via pump (206), where it is mixed with the untreated waste water (200) to form a biological active mixture. Alternatively, or in addition, at least a portion of the concentrate (251) may be mixed with at least a portion of the untreated waste water (200) inside the pipe which connects between the pressure side of the pump (206) and the inlet zone of the bioreactor (208).

A mass balance of TSS for the FTM plant of FIG. 7 is shown in Table 4 below.

TABLE 4

| Zone | Volume (m³) | g/L | Total kg |
|---|---|---|---|
| N | 250 | 12.0 | 3000 |
| AN DN | 150 | 12.0 | 1800 |
| Total | 400 | | 4800 |
| Average TSS | | 12.0 | |

External FTM Treatment Plant

Figure 8:
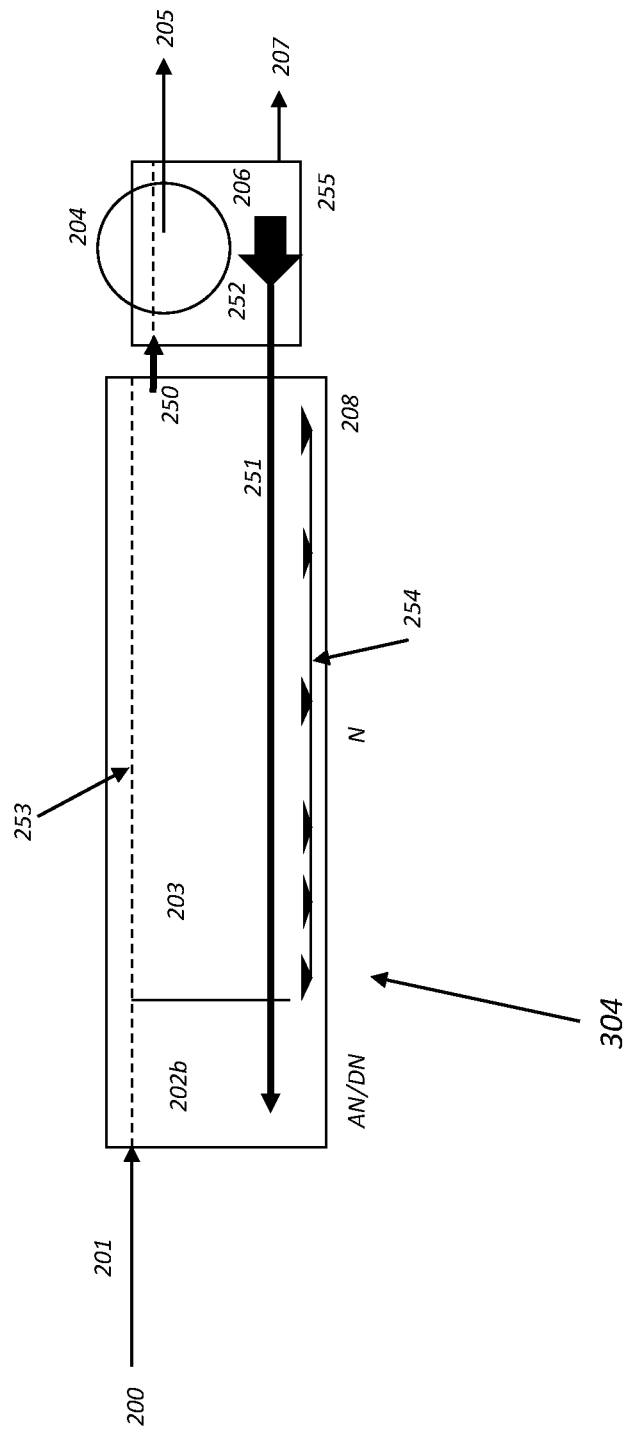
FIG. 8 is a schematic diagram of an external FTM treatment plant according to another aspect of the present invention.

In another embodiment of the invention, an External FTM Treatment Plant (304) is provided and shown in FIG. 8. The FTM is installed in a separate tank (255). The operation and mass balance of this embodiment are equivalent to those of the Integrated FTM Treatment plant (303), and also in the case of the storm-water mass balance. The treated waste water (250) is preferentially fed into the separate tank (255) from the opposite end of the tank (208) to the wastewater input (201) by gravity, the liquid level in the FTM tank being lower than the liquid level (253) in the nitrification region. The RAS (251) is returned to the front of the process by means of a suitable low-head pump (206) and mixed with untreated waste water (200) to form a biological active mixture. The FTM provides clean effluent (205) with less than 10 mg/L TSS. Alternatively, the FTM (204) may be elevated above the bioreactor (208), such that gravity transports the RAS to the bioreactor (208).

Part of the high-solid-content sludge (252) adjacent to the filter machine (204) and/or at the bottom of the separate tank (255) is separately collected (207) and wasted to maintain stable conditions in the plant.

Thickened activated sludge from below and/or adjacent (252) the FTM (204) is preferentially pumped with a pump (206) to the anoxic/anaerobic zone (202) adjacent to the inflow (201). A contactor to facilitate highly turbulent mixing the waste water (200) and the concentrate (251) to form a biological active mixture at the inlet zone may be used. Alternatively, or in addition, the untreated waste water (200) and the concentrate may be at least partially mixed upstream from the inlet zone, such as in a pipe transferring the concentrate to the inlet of the bioreactor.

Another novel feature of the External FTM treatment plant is that the RAS pump (206) can return the activated sludge to a region of the treatment tank (208) approximately at the same hydrostatic level of the region where the RAS is collected. Therefore, the pump (206) can be a low-head pump, which is cheaper than the equivalent pump (210) in the CAS plant and requires less electrical power. In addition, the low head high volume RAS pump (206) facilitates a large recirculation but maintains a plug flow (i.e. a regime where reactions occur in a linear fashion with time) profile through the tankage. This pump (206) may be used to provide an additional control to the FTM (204) as it controls influent to the FTM via flow pacing.

Another advantage of the FTM treatment plant is that the RAS can be routed directly to the combined AN/DN zone of the bioreactor tank (202b). Therefore the pumps (211) and (212) of the CAS plant (304) or the pump (212) of the MBR plant are not needed. In another embodiment of the invention, a pump (not shown) drives the flow (250) of treated wastewater from the end (opposite to the inflow end) of the bioreactor (208) to the FTM (204). The RAS (251) is returned to the front of the process by means of a suitable low-head pump (206).

In another embodiment of the invention, a pump (not shown) drives the flow (250) of treated waste water from the end (opposite to the inflow end) of the bioreactor (208) to the FTM (204). However the RAS (251) is returned to the front of the process (202b) by gravity and a pump (206) would no longer be required.

Another major improvement with respect to the known art becomes clear when considering storm-water regimes. Typical flow rates and expected mass balances are similar to those shown in FIG. 7 for the integrated FTM plant (303). Similarly to the integrated FTM plant (303), the external FTM plant (304) can also cope with TSS levels that can locally exceed 20,000 mg/L in the proximity of the FTM (204) without affecting the effluent quality, while retaining low DO in the RAS.

Hybrid CAS/FTM Treatment Plants

Figure 9:
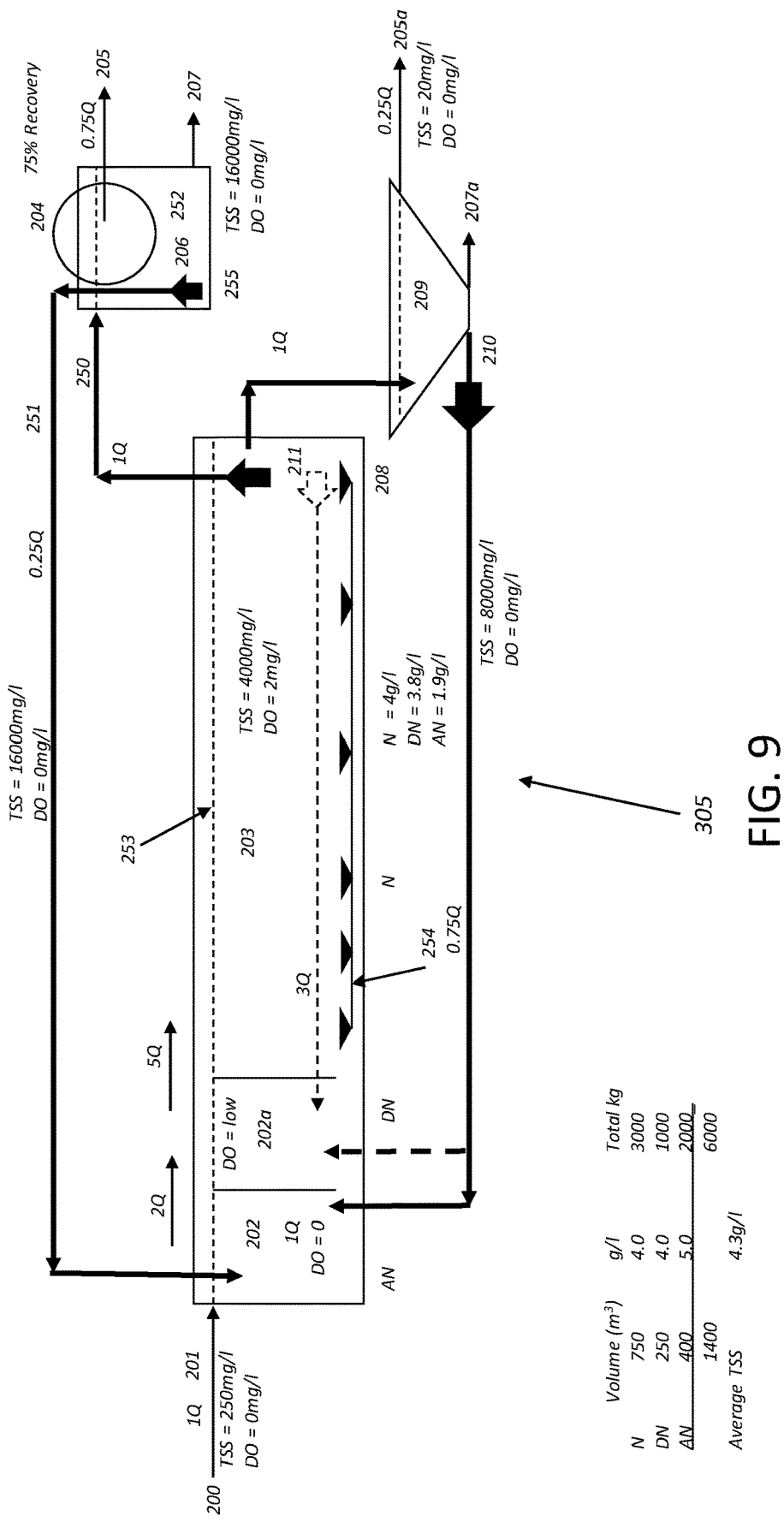
FIG. 9 is a schematic diagram of a hybrid CAS/FTM treatment plant according to another aspect of the present invention.

Referring to FIG. 9, a further embodiment (305) of the present invention, consisting of a hybridization of a CAS plant (301) with at least one FTM (204), is provided. Of particular interest, this new plant (305) can be implemented almost everywhere by retrofitting existing waste water treatment plants (WWTPs) at minimal cost.

The untreated wastewater (200) flows in at the waste water input (201) (the TSS of the waste water=approximately 250 mg/L) entering an AN region (202) with a nominal flow rate of Q=1,500 m³/day, DO close to zero and negative ORP~−200 mV. Here anaerobic bacteria release phosphorous. The liquid, having a level (253), flows into a DN region (202a), where the low DO regime favors bio-reactions leading to de-nitrification (nitrates are transformed into nitrogen gases) of the liquid.

With respect to a CAS system, the hybrid CAS/FTM treatment plant (305) includes an FTM (204) in a separate tank (255), which can be optionally or alternatively located inside the nitrification tank. The FTM (204) and the clarifier (209) share the task of thickening and dewatering the sludge and providing clean effluents (205, 205a). At ADF, a preferentially unitary flow (Q) is fed into the FTM (204) from the end of the nitrification tank and or zone (203) and an equivalent flow (Q) is fed into the clarifier (209). In this configuration, the clarifier receives a reduced flow, approximately 55% of the flow in an equivalent CAS plant.

An advantage of the present invention is that the reduced flow in the clarifier (209) allows operating it in a significantly more favorable regime, with a retention time increased by 80%. Such extremely long time enables full oxygen and nitrate depletion and hence allows the RAS to be returned directly to the AN zone by a pump (210) (see solid bold line rather than dashed bold line in FIG. 9). The RAS that is returned via pump (210) has a TSS content of 8,000 mg/L.

The mass balance of TSS for the FTM/CAS hybrid plant of FIG. 9 is shown in Table 5 below.

TABLE 5

| Zone | Volume (m$^3$) | g/L | Total kg |
|---|---|---|---|
| N | 750 | 4.0 | 3000 |
| DN | 250 | 4.0 | 1000 |
| AN | 400 | 5.0 | 2000 |
| Total | 1400 | | 6000 |
| Average TSS | | 4.3 | |

The mass balance shown in Table 5 highlights an increase of TSS in the AN zone from 1.9 g/L in a CAS plant (301) to 5 g/L in the Hybrid CAS/FTM (305). This corresponds to an increase in suspended solid concentration of a factor of 2.6× at the beginning of the process, where the TSS dilution caused by the influent (200) has, in this case, a less dramatic effect affording an increased biological activity.

An additional advantage with respect to the known art is that the hybrid CAS/FTM plant (305) does not require an AN RAS pump (212 in FIG. 1).

Clean (TSS~20 mg/L) effluent (205a) with a flow rate of 0.25 Q is decanted from the top of the clarifier (209). The unitary flow 1 Q of activated sludge fed into the FTM (204) is thickened and dewatered there, achieving a TSS of 16,000 mg/L. Clean (i.e., TSS~0 mg/L) effluent (205) with a flow rate of 0.75 Q is extracted from the FTM (204).

In an embodiment of the invention, the flow of activated sludge from the nitrification region to the FTM (204) is driven by gravity, the liquid level in FTM tank being lower than the liquid level in the nitrification region. The RAS is returned to the front of the process by means of a suitable pump.

In another embodiment of the invention, a pump drives the flow of activated sludge from the nitrification region to the FTM. The RAS is returned to the front of the process by means of a suitable pump.

In a further embodiment of the invention, a pump drives the flow of activated sludge from the nitrification region to the FTM. The RAS is returned to the front of the process by gravity, the level of the filtrate in the FTM being above the level of the liquid in the AN region.

One major additional advantage of this hybridization is that the waste activated sludge can be drawn from the FTM (204) at 16,000 mg/L, which removes the need for gravity sludge thickening.

Figure 5:
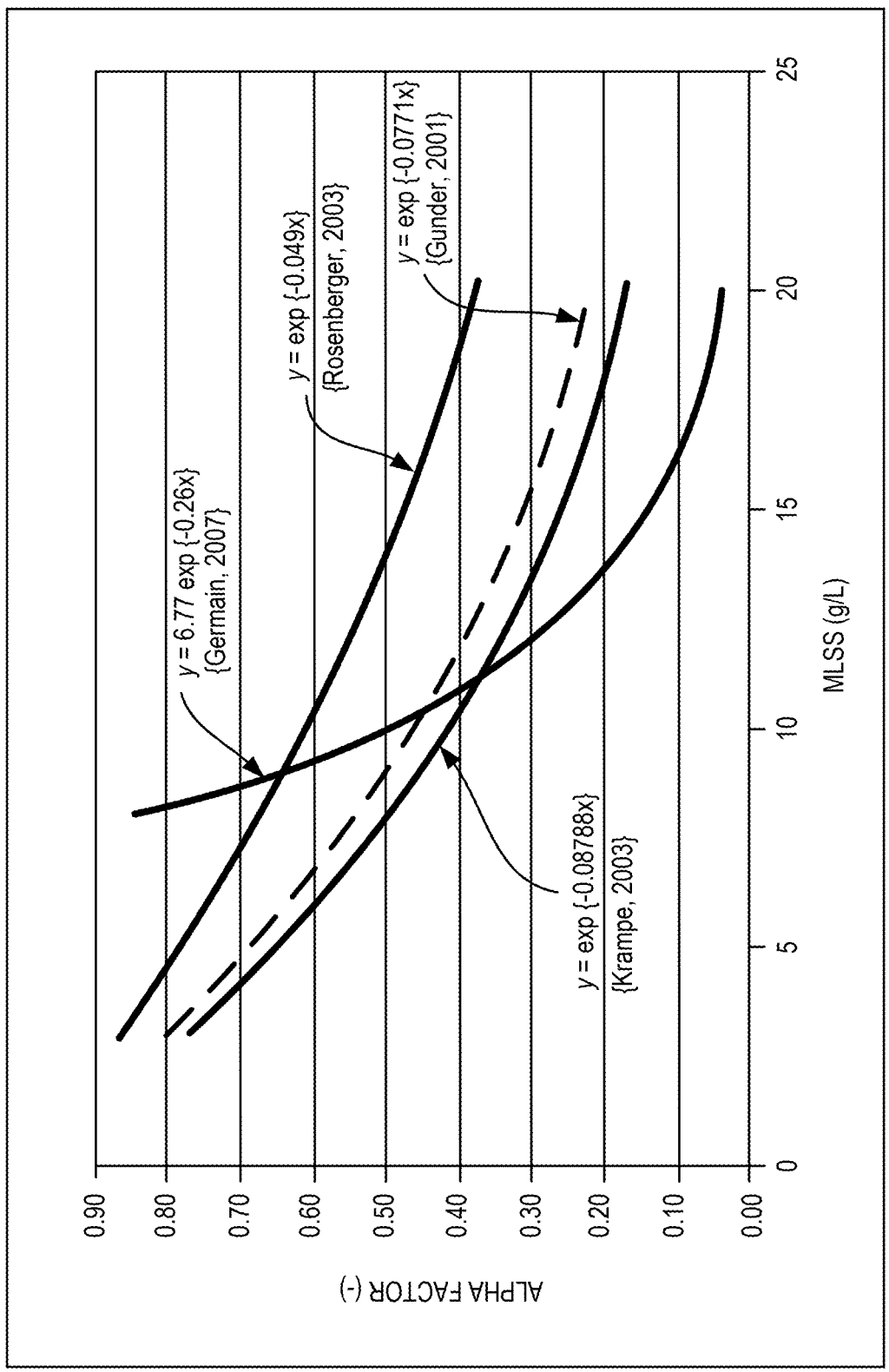
FIG. 5 is a graph of a Gunder curve.

As discussed for the FTM treatment plant, the high TSS in the FTM tank suppresses oxygen dissolution in water even in the presence of air scouring (see FIG. 5). In this regime the RAS becomes DO and NO$_3$ depleted and can be returned directly to the AN region (202) with a pump (206).

The increased TSS concentration in the AN and DN tanks raises the total sludge in the plant from 4,710 to 6,000 kg (i.e., 30% more sludge in the same volume at the same operational MLSS (mixed liquor suspended solids) concentration of 4 g/L). More sludge mass leads to enhanced treatment capacity and, as the sludge has moved to the front of the process, the system is vastly more stable against rain and peak hydraulic loads. Interestingly, this enhanced operation regime does not require changing the aeration conditions and/or the aeration system (254) in the nitrification zone from the original CAS implementation.

If more FTMs are added to the design, eventually the FTMs will transform the WWTP into an integrated FTM plant and all hydraulic capacity will transfer to the FTMs making the clarifier redundant, driving the running and maintenance costs down.

Figure 10:
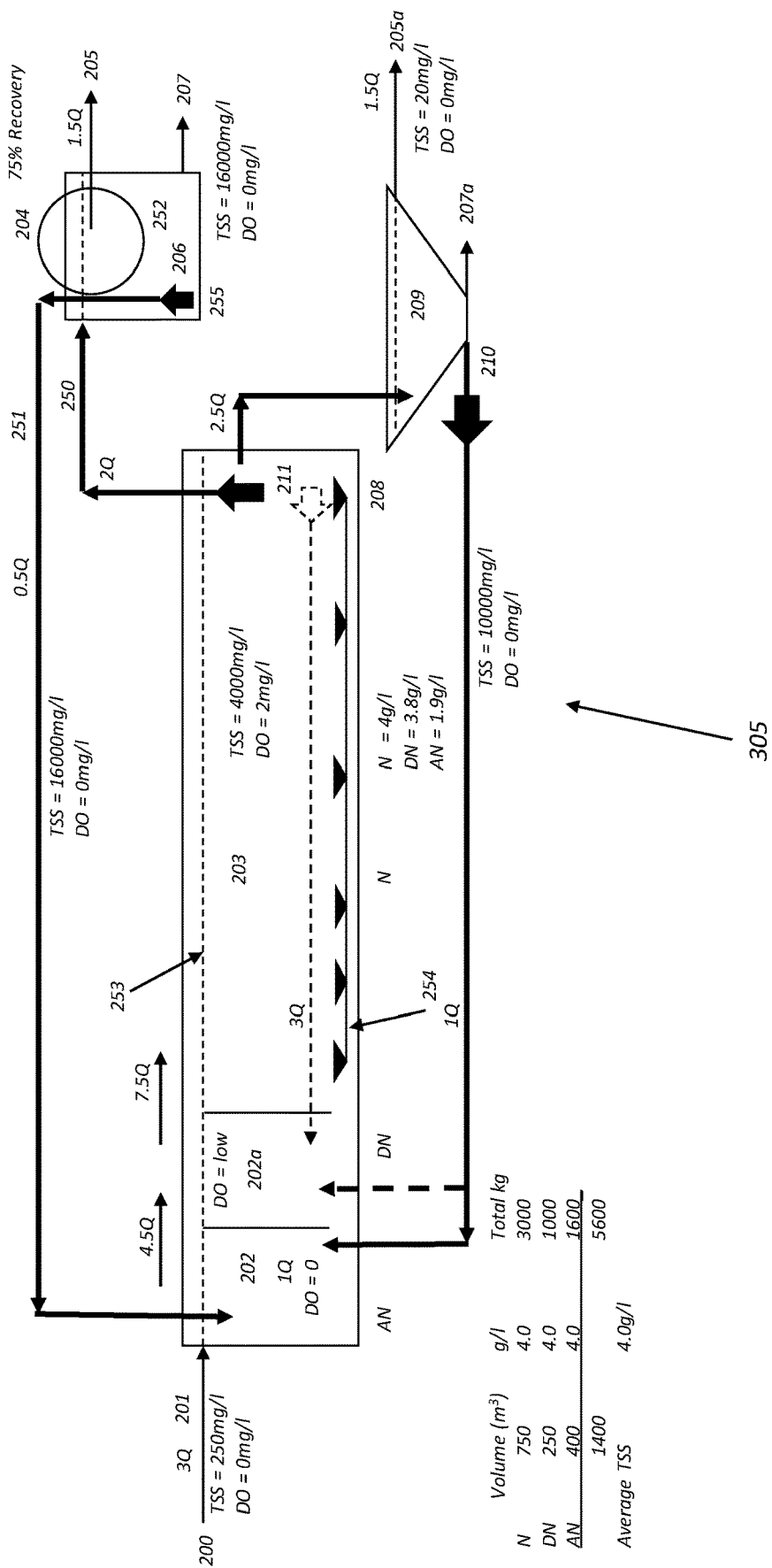
FIG. 10 is a schematic diagram of a hybrid CAS/FTM treatment plant in a storm-water regime according to another aspect of the present invention.

A further significant advantage of the present invention with respect to the state of the art becomes apparent when considering storm-water regimes. As an example, flow rates and expected mass balances with an influent flow of 3 Q are shown in FIG. 10. The mass balance of FIG. 10 is shown in Table 6 below.

TABLE 6

| Zone | Volume (m$^3$) | g/L | Total kg |
|---|---|---|---|
| N | 75 | 4.0 | 3000 |
| DN | 250 | 4.0 | 1000 |
| AN | 400 | 4.0 | 1600 |
| Total | 1400 | | 5600 |
| Average TSS | | 4.0 | |

The presence of the FTM reduces the load on the clarifier (209), which can be fed with a flow of 2.5 Q, 50% of the flow in the CAS in an equivalent plant load. In typical treatment plants, the clarifiers are designed and specified to handle influent flows even larger than 3 Q. Hence, at 2.5 Q they would still be within their specifications and would be able to provide compliant effluent at 1.5 Q with TSS≤20 mg/L and DO=0 mg/L.

Also in the storm-water regime described herein, the RAS from the clarifier (209) would be DO and nitrate depleted, with a TSS content of 10,000 mg/L, therefore suitable to be returned to the AN tank using the pump (206).

A flow of 2 Q from the nitrification zone or tank (208) feeds the FTM (204). The dewatering of the solids on the FTM filter material yields an activated sludge with suspended solid content of approximately 16,000 mg/L. As discussed above, the high TSS in the FTM tank suppresses oxygen dissolution in water even in the presence of air scouring (see FIG. 5). In this regime the RAS is DO and NO$_3$ depleted and can be returned directly to the AN region (202).

The benefits coming from the addition of an FTM (204) to a CAS plant (301) in storm-water regime are further highlighted when considering the mass balance in the AN region (202).

Despite a large influent flow of 3 Q, the TSS in AN would still remain at ~4,000 mg/L (i.e., 300% larger than an equivalent CAS plant in storm-water regime and even 100% larger than an equivalent CAS at ADF), affording an increased biological activity.

A preferred method to take advantage from retrofitting a FTM (204) to an existing CAS treatment plant consists in operating the CAS plant as designed, with the FTM in a stand-by state, when the flow is close to ADF. In the case an increase in influent flow is forecast, e.g. due to a storm approaching the site, the FTM (204) is started and is operated as described above to increase the TSS at the front of the process plant in preparation for the additional dilution that will occur when the flow increases.

Figure 11:
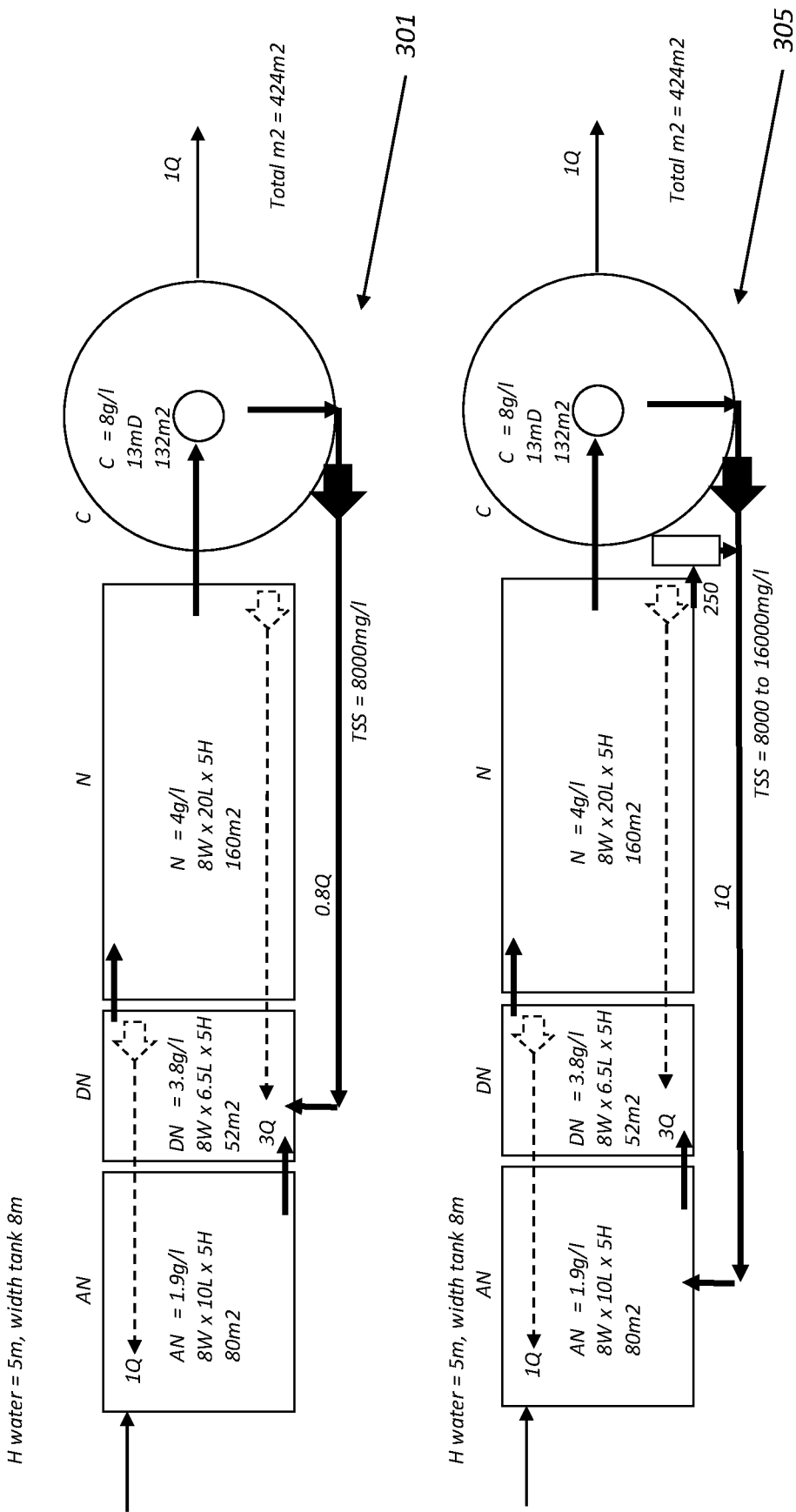
FIG. 11 is a schematic diagram and a mass balance comparison between a CAS treatment plant and a hybrid CAS/FTM treatment plant according to another aspect of the present invention.

Conveniently, incorporating an FTM (204) to an existing CAS plant requires minimal space, as shown in FIG. 11, where the rectangle between the clarifier (C) and the nitrification tank (N) in the bottom drawing represents the FTM tank. As shown in FIG. 11, the dimensions of each plant and zone of each plant are provided.

Computer Control System

The performances of any of the embodiments described above can be greatly improved if the operating parameters can be changed to adapt them to achieve the best operating conditions for any given influent content and flowrate.

Figure 12:
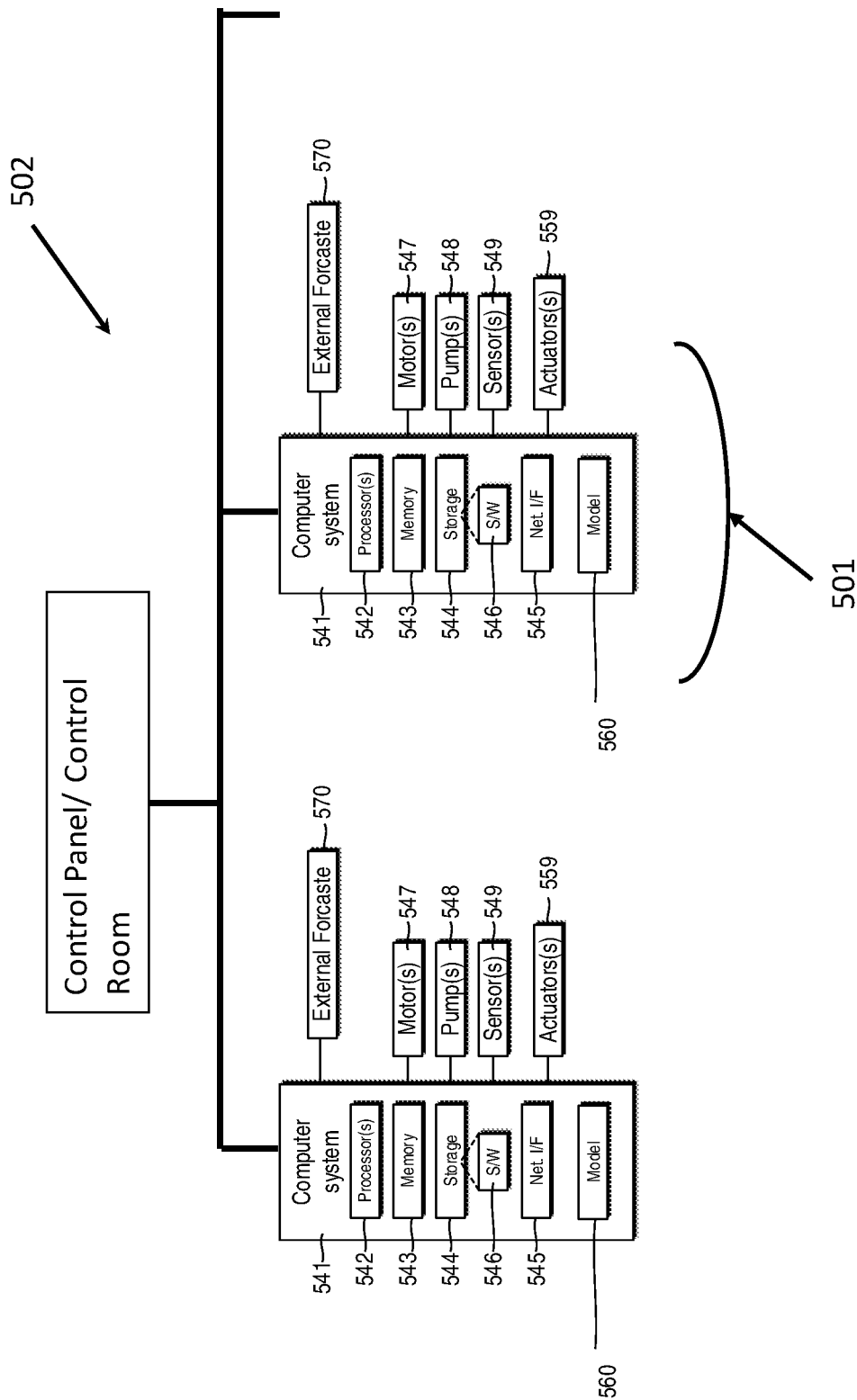
FIG. 12 is a schematic diagram of a computer system/control system used for a treatment plant according to another aspect of the present invention.

In this embodiment, any of the previously described embodiments is combined with a control system (502) and a control process, as depicted in FIG. 12.

Each of a set of at least one computer systems (501) is used to control the active parts of a subset of the plant or of the entire plant, including the motors (547), the pumps (548), and the actuators in the plant. Each Computer system (501) is composed by one or more processors (542) and of volatile and non-volatile memory (543) or any of the latter two, on-board or external storage (544), a software (545) to run the control algorithm, preferentially a connection to the internet (546). The computer receives external data from sensors (549) and from other external sources, preferentially including weather forecasts, weather observations, historical data, and daily inflow profiles. The computer system (541) is also provided with a model (560) or provided with the results from models running elsewhere that provide influent predictions based on, for example, behavioral patterns or seasonal patterns. The computer system also includes one or more algorithms to analyze the data coming from said sources and to calculate the optimal working parameters for the plant in preparation for the expected influent and/or to treat the specific influent that it receives. The computer systems (501) can be autonomous or mutually connected. In a preferred embodiment, the computer systems (501) are connected to a control panel or a control room that provides access to the plant operating conditions, to the results of the models, and provides means to control the plant operation.

The control of the plant can be fully automated, semi-automated, and/or manual of a combination of any of these.

EXAMPLES

Three different types of waste water treatment plant systems were compared. The MBR systems used to generate the data in Table 8 were Aquapolo in São Paulo, Brazil and Capivari2 from SANASA. The CAS systems used to generate the data in Table 8 were bioLoop and ICEAS from Xylem, Inc. The FTM systems used to generate the data in Table 8 were Idrica STP in Rome, Italy and Zeli Pilot in Zelienople, Pennsylvania Values for cost, operational cost, space, energy per cubic meter of water, and quality of effluent were averaged for each of CAS, MBR, and FTM systems and tabulated in Table 8 below.

TABLE 8

| System | Cost of System | Operational Cost | Space | Energy per cubic meter water | Quality of effluent (e.g. meets discharge consent requirements in terms of TSS) |
|---|---|---|---|---|---|
| CAS | 100% | Average | 1 | 0.25-0.35 kWh/m3 | 65% |
| MBR | 120% | Very high | 0.49 | 0.45-0.85 kwh/m3 | 100% |
| Purpose build bioreactor with integrated FTM | 85% | Below average | 0.24 | 0.2-0.35 kwh/m3 | 100% |

For each of the above systems in Table 8, each plant has full Biological Nutrient Removal (BNR) and Full Biological phosphor removal (Full BioP), a total suspended solids of 4800 kg, and an average daily flow (ADF) of 1500 m$^3$/day. As shown in Table 8, The FTM system costs less, both for the system and during operation, takes up less space, and requires less energy per cubic meter water, compared to the CAS and MBR systems. Further, the effluent quality of the FTM system is comparable to that of the more expensive, larger, and less energy efficient MBR system and is a better quality compared to the CAS system.

It is to be understood that the invention may assume various alternative variations, except where expressly specified to the contrary. It is also to be understood that the specific devices illustrated in the attached drawings, and described in the specification, are simply exemplary embodiments of the invention. Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope thereof. For example, it is to be understood that the present invention contemplates that, to the extent possible, one or more features of any embodiment can be combined with one or more features of any other embodiment. The embodiments of the invention described herein above in the context of the preferred embodiments are not to be taken as limiting the embodiments of the invention to all of the provided details thereof, since modification and variations thereof may be made without departing from the spirit and scope of the embodiments of the invention.

The invention claimed is:

1. A method of processing wastewater to produce a filtrate comprising the following steps:
   introducing untreated wastewater to an inlet zone of a bioreactor;

introducing a concentrate of treated wastewater into the inlet zone of the bioreactor to form a biological active mixture, the concentrate having at least 10,000 mg/L of total suspended solids;

aerating the biological active mixture in an aeration zone of the bioreactor to produce further treated wastewater;

filtering the further treated wastewater to produce a filtrate and produce a further concentrate, wherein the filtrate created by the filtering has total suspended solids of less than 10 mg/L and the further concentrate has total suspended solids of at least 10,000 mg/L, wherein the filtering is performed by a filter having a permeable substrate, and further comprising: fouling the permeable substrate to form a layer of deposited suspended solids from the further treated wastewater on the permeable substrate, removing at least a portion of the layer, and mixing the removed portion of the layer with at least a portion of the further treated wastewater to form the further concentrate with the at least 10,000 mg/L of total suspended solids;

transferring at least a portion of the further concentrate to the inlet zone of the bioreactor; and transferring the filtrate external to the bioreactor as clean water.

2. A method of processing wastewater to produce a filtrate comprising the following steps:

combining untreated wastewater and a concentrate of treated wastewater to form a biological active mixture, the concentrate having at least 10,000 mg/L of total suspended solids;

transferring the biological active mixture into an inlet zone of a bioreactor;

aerating the biological active mixture in an aeration zone of the bioreactor to produce further treated wastewater;

filtering the further treated wastewater to produce a filtrate and produce a further concentrate, wherein the filtrate created by the filtering has total suspended solids of less than 10 mg/L and the further concentrate has total suspended solids of at least 10,000 mg/L, wherein the filtering is performed by a filter having a permeable substrate, and further comprising: fouling the permeable substrate to form a layer of deposited suspended solids from the further treated wastewater on the permeable substrate, removing at least a portion of the layer, and mixing the removed portion of the layer with at least a portion of the further treated wastewater to form the further concentrate with the at least 10,000 mg/L of total suspended solids;

transferring at least a portion of the further concentrate to the inlet zone of the bioreactor; and transferring the filtrate external to the bioreactor as clean water.

3. The method of claim 1, further comprising holding the biological active mixture in the inlet zone for a predetermined time to enable an anoxic process in an anoxic zone and/or a denitrification zone.

4. The method of claim 1, wherein a contactor mixes the untreated wastewater and the concentrate in the inlet zone, wherein the mixing is turbulent.

5. The method of claim 1, wherein the transferring at least a portion of the further concentrate step further comprises: pumping the further concentrate and/or maintaining a differential liquid head between a source of the further concentrate and the inlet zone.

6. The method of claim 1, further comprising:
monitoring the total suspended solids of the further concentrate; and
controlling the filtering of the further treated wastewater to maintain the further concentrate with at least 10,000 mg/L total suspended solids.

7. The method of claim 1, further comprising spraying at least a portion of the further treated wastewater at the permeable substrate to remove at least a portion of the layer of deposited suspended solids, and introducing gas bubbles from at least one gas feeder into the further treated wastewater,
wherein the filtering is performed by a filter comprising:
a liquid-permeable filtering element having a first face and a second face opposite of the first face, wherein at least an area of the first face of the liquid-permeable filtering element is subject to the further treated wastewater under pressure and a pressure across said area is greater than 0 and less than or equal to 5.9 kPa, wherein the further concentrate is accumulated on the first face of the liquid-permeable filtering element, and
at least one nozzle that directs at least one jet at the second face of the liquid-permeable filtering element, through the liquid-permeable filtering element, and towards the first face of the liquid-permeable filtering element to remove and/or aid in removal of the layer of deposited solids.

8. The method of claim 1, wherein a level of dissolved oxygen in the further concentrate is no more than 0.5 mg/L.

9. The method of claim 1, wherein a level of nitrate ($NO_3$) in the further concentrate is no more than 3 mg/L.

10. The method of claim 2, wherein the combining step further comprises actively mixing the untreated wastewater and the concentrate of treated wastewater with at least 10,000 mg/L of total suspended solids to form the biological active mixture.

11. The method of claim 2, wherein the combining step further comprises combining the untreated wastewater and the concentrate of treated wastewater with at least 10,000 mg/L of total suspended solids in a transfer pipe to form the biological active mixture.

* * * * *